United States Patent [19]
Lutz

[11] Patent Number: 5,908,301
[45] Date of Patent: Jun. 1, 1999

[54] METHOD AND DEVICE FOR MODIFYING BEHAVIOR

[76] Inventor: Raymond Lutz, 1010 Old Chase Ave., Ste. B, El Cajon, Calif. 92020

[21] Appl. No.: 08/778,815

[22] Filed: Jan. 3, 1997

Related U.S. Application Data

[60] Provisional application No. 60/032,109, Dec. 5, 1996.
[51] Int. Cl.$^6$ ............................. G09B 19/00; A61B 10/00
[52] U.S. Cl. .......................... 434/236; 434/127; 128/921
[58] Field of Search ................................. 434/127, 236; 364/709.01, 709.02; 128/921

[56] References Cited

U.S. PATENT DOCUMENTS

| | | | |
|---|---|---|---|
| 3,424,123 | 1/1969 | Giffard | 116/2 |
| 4,218,611 | 8/1980 | Cannon | 235/92 |
| 4,652,241 | 3/1987 | McCarty | 434/127 |
| 4,853,854 | 8/1989 | Behar et al. | 364/413.01 |
| 4,862,431 | 8/1989 | Drouin | 368/10 |
| 4,966,164 | 10/1990 | Colsen et al. | 128/789 |
| 5,233,520 | 8/1993 | Kretsch et al. | 364/413.29 |
| 5,398,688 | 3/1995 | Laniado | 128/660.02 |
| 5,729,479 | 3/1998 | Golan | 364/709.02 |

*Primary Examiner*—Robert A. Hafer
*Assistant Examiner*—John Edmund Rovnak

[57] ABSTRACT

An interactive pre-set and adjustable behavior modification device suitable for encouraging modification of various behaviors, such as reduced or increased food intake, tobacco use, and alcohol consumption for example, having a plurality of parameters from which a user may selectably choose and adjust a program or accept the default program. The device monitors, and if selected by a user, adjusts, any behavior sequence which includes behavior actions and behavior intervals. If a preset program is selected and the default used, no record of any behavior action or interval is maintained. All other programs selected are recorded and automatically adjusted for the next behavior sequence. A display on the device shows the user what has been selected and the operation of the program. It has a multiple output signals alerting a user of when to begin the next behavior action; when the pre-determined number of behavior actions has been attained; when the pre-determined number of behavior actions is being exceeded; and a special alert signal. The device is configured to accept, and modify automatically or manually, a user's intended goal and the rate at which the user desires to attain the goal. In relation to goal and rate, it is configured to accept and modify the user's physical condition at the start of each program which, when so entered, re-evaluates the progress and adjusts related programs accordingly.

18 Claims, 10 Drawing Sheets

| Old State 141 | Keys | Action | New State 141 | Display 11 | Display 12 | Display 13 | Display 14 |
|---|---|---|---|---|---|---|---|
| (Off) | -- | | (Off) | (blank) | (blank) | (blank) | (blank) |
| (Off) | {any} | | Deactivated | <EVENT> | <PACE> | <SIZE> | <PLAN> |
| Deactivated | -- | | Deactivated | <EVENT> | <PACE> | <SIZE> | <PLAN> |

FIG. 9: Power-On

| Old State | Keys | Action | New State 141 | Display 11 | Display 12 | Display 13 | Display 14 |
|---|---|---|---|---|---|---|---|
| Deactivated | {User} 21b, 220 | | User Select | (blank) | "USER" | <USER> | <PLAN> |
| User Select | {↑} 18a | Increment <USER> | User Select | (blank) | "USER" | <USER> | <PLAN> |
| User Select | {↓} 18b | Decrement <USER> | User Select | (blank) | "USER" | <USER> | <PLAN> |
| User Select | {Go/Pause} 16a | Record <USER> A | Deactivated | <EVENT> | <PACE> | <SIZE> | <PLAN> |
| User Select | {Stop} 16b | Abort Change | Deactivated | <EVENT> | <PACE> | <SIZE> | <PLAN> |

FIG. 10: Select User -- Only possible from Deactivated state.

| Old State | Keys | Action | New State 141 | Display 11 | Display 12 | Display 13 | Display 14 |
|---|---|---|---|---|---|---|---|
| Deactivated 142 | {Event} 21a, 220 | | Event Select | <EVENT> | "MEAL" | (blank) | <PLAN> |
| Event Select | {↑} 18a | Subsequent <EVENT> "B"→"AB"→ "L"→"AL"→ "D"→"AD"→ "G"→"B" | Event Select | <EVENT> | "MEAL" | (blank) | <PLAN> |
| Event Select | {↓} 18b | Prior <Event> "B"→"G"→ "AD"→"D"→ "AL"→"L"→ "AB"→"B" | Event Select | <EVENT> | "MEAL" | (blank) | <PLAN> |
| Event Select | {Go/Pause} 16a | Record <EVENT> B | Deactivated | <EVENT> | <PACE> | <SIZE> | <PLAN> |
| Event Select | {Stop} 16b | Abort Change | Deactivated | <EVENT> | <PACE> | <SIZE> | <PLAN> |

FIG. 11: Select Event -- Deactivated state only

| Old State | Keys | Action | New State 141 | Display 11 | Display 12 | Display 13 | Display 14 |
|---|---|---|---|---|---|---|---|
| Deactivated 142 | {Plan} 22a, 220 | | Plan Select | (blank) | "PLAN" | (blank) | <PLAN> |
| Plan Select | {↑} 18a | Increment <PLAN> "PACED"→ "FIXED"→ "AVG"→ "AUTO"→ "ALERT"→ "PACED" | Plan Select | (blank) | "PLAN" | (blank) | <PLAN> |
| Plan Select | {↓} 18b | Decrement <PLAN> "PACED"→ "ALERT"→ "AUTO"→ "AVG"→ "FIXED"→ "PACED" | Plan Select | (blank) | "PLAN" | (blank) | <PLAN> |
| Plan Select | {Go/Pause} 16a | Record <EVENT> B | Deactivated 142 | <EVENT> | <PACE> | <SIZE> | <PLAN> |
| Plan Select 64 | {Stop} 16b | Abort Change | Deactivated 142 | <EVENT> | <PACE> | <SIZE> | <PLAN> |

FIG. 12: Select Plan -- Deactivated state only

| Old State | Keys | Actions | New State 141 | Display 11 | Display 12 | Display 13 | Display 14 |
|---|---|---|---|---|---|---|---|
| Deactivated 142 | {Size} 22b, 220 | | Adjust SIZE | (blank) | "SIZE" | <SIZE> | <PLAN> |
| Adjust SIZE | {↑} 18a | Increment <SIZE> | Adjust SIZE | (blank) | "SIZE" | <SIZE> | <PLAN> |
| Adjust SIZE | {↓} 18b | Decrement <SIZE> | Adjust SIZE | (blank) | "SIZE" | <SIZE> | <PLAN> |
| Adjust SIZE | {Go/Pause} 16a | Record <SIZE> E | Deactivated 142 | <EVENT> | <PACE> | <SIZE> | <PLAN> |
| Adjust SIZE | {Stop} 16b | Abort Change | Deactivated 142 | <EVENT> | <PACE> | <SIZE> | <PLAN> |

FIG. 13: Adjust SIZE from Deactivated State

| Old State | Keys | Actions | New State 141 | Display 11 | Display 12 | Display 13 | Display 14 |
|---|---|---|---|---|---|---|---|
| Deactivated 142 | {Pace} 22c, 220 | | Adjust PACE | (blank) | "PACE" | <PACE> | <PLAN> |
| Adjust PACE | {↑} 18a | Increment <PACE> | Adjust PACE | (blank) | "PACE" | <PACE> | <PLAN> |
| Adjust PACE | {↓} 18b | Decrement <PACE> | Adjust PACE | (blank) | "PACE" | <PACE> | <PLAN> |
| Adjust PACE | {Go/Pause} 16a | Record <PACE> F | Deactivated 142 | <EVENT> | <PACE> | <SIZE> | <PLAN> |
| Adjust PACE | {Stop} 16b | Abort Change | Deactivated 142 | <EVENT> | <PACE> | <SIZE> | <PLAN> |

FIG. 14: Adjust PACE: from Deactivated State; Range 0-99

| Old State | Keys | Actions | New State 141 | Display 11 | Display 12 | Display 13 | Display 14 |
|---|---|---|---|---|---|---|---|
| Paused 150 | {Size} 22b, 220 | | Adjust SIZE | (blank) | "SIZE" | <SIZE> | <PLAN> |
| Adjust SIZE | {↑} 18a | Increment <SIZE> | Adjust SIZE | (blank) | "SIZE" | <SIZE> | <PLAN> |
| Adjust SIZE | {↓} 18b | Decrement <SIZE> | Adjust SIZE | (blank) | "SIZE" | <SIZE> | <PLAN> |
| Adjust SIZE | {Go/Pause} 16a | Record <SIZE> E | Paused 150 | <EVENT> | "WAIT" | <CNT> | <PLAN> |
| Adjust SIZE | {Stop} 16b | Abort Change | Paused 150 | <EVENT> | "WAIT" | <CNT> | <PLAN> |

FIG. 15: Adjust SIZE from Paused State

| Old State | Keys | Actions | New State 141 | Display 11 | Display 12 | Display 13 | Display 14 |
|---|---|---|---|---|---|---|---|
| Paused 150 | -- | | Paused 150 | (blank) | "WAIT" | <CNT> | <PLAN> |
| Paused 150 | {↑} 18a | Increment <CNT> | Paused 150 | (blank) | "WAIT" | <CNT> | <PLAN> |
| Paused 150 | {↓} 18b | Decrement <CNT> | Paused 150 | (blank) | "WAIT" | <CNT> | <PLAN> |
| Paused 150 | {Go/Pause} 16a | Record <CNT> E | Actived 146 | <EVENT> | <TIMER> | <CNT> | <PLAN> |
| Paused 150 | {Stop} 16b | Abort Change | Paused 150 | <EVENT> | "WAIT" | <CNT> | <PLAN> |

FIG. 16: Adjust Actual Behavior Count (CNT) from Paused State

| Old State | Keys | Actions | New State 141 | Display 11 | Display 12 | Display 13 | Display 14 |
|---|---|---|---|---|---|---|---|
| Paused 150 | {Pace} 22c, 220 | | Adjust PACE 94 | (blank) | "PACE" | <PACE> | <PLAN> |
| Adjust PACE 94 | {↑} 18a | Increment <PACE> | Adjust PACE 94 | (blank) | "PACE" | <PACE> | <PLAN> |
| Adjust PACE 94 | {↓} 18b | Decrement <PACE> | Adjust PACE 94 | (blank) | "PACE" | <PACE> | <PLAN> |
| Adjust PACE 94 | {Go/Pause} 16a | Record <PACE> F | Paused 150 | <EVENT> | "WAIT" | <CNT> | <PLAN> |
| Adjust PACE 94 | {Stop} 16b | Abort Change | Paused 150 | <EVENT> | "WAIT" | <CNT> | <PLAN> |

FIG. 17: Adjust PACE: from Paused State; Range 0-99 seconds

| Old State | Keys | Actions | New State 141 | Display 11 | Display 12 | Display 13 | Display 14 |
|---|---|---|---|---|---|---|---|
| Deactivated 141 | {Goal} 20b, 220 | | Adjust GOAL | (blank) | "GOAL" | <GOAL> | "AUTO" |
| Adjust GOAL | {↑} 18a | Increment <GOAL> | Adjust GOAL | (blank) | "GOAL" | <GOAL> | "AUTO" |
| Adjust GOAL | {↓} 18b | Decrement <GOAL> | Adjust GOAL | (blank) | "GOAL" | <GOAL> | "AUTO" |
| Adjust GOAL | {Go/Pause} 16a | Record <GOAL> G | Deactivated 141 | <EVENT> | <PACE> | <SIZE> | "AUTO" |
| Adjust GOAL | {Stop} 16b | Abort Change | Deactivated 141 | <EVENT> | <PACE> | <SIZE> | "AUTO" |

FIG. 18: Adjust GOAL: Auto Plan Only, Deactivated Only; Range 0-999

| Old State | Keys | Actions | New State 141 | Display 11 | Display 12 | Display 13 | Display 14 |
|---|---|---|---|---|---|---|---|
| Deactivated 141 | {Rate} 20c, 220 | | Adjust RATE | (blank) | "RATE" | <RATE> | "AUTO" |
| Adjust RATE | {↑} 18a | Increment <RATE> | Adjust RATE | (blank) | "RATE" | <RATE> | "AUTO" |
| Adjust RATE | {↓} 18b | Decrement <RATE> | Adjust RATE | (blank) | "RATE" | <RATE> | "AUTO" |
| Adjust RATE | {Go/Pause} 16a | Record <RATE> H | Deactivated 141 | <EVENT> | <PACE> | <SIZE> | "AUTO" |
| Adjust RATE | {Stop} 16b | Abort Change | Deactivated 141 | <EVENT> | <PACE> | <SIZE> | "AUTO" |

FIG. 19: Adjust RATE: Auto Plan Only, Deactivated Only; Range 0-99

| Old State | Keys | Actions | New State 141 | Display 11 | Display 12 | Display 13 | Display 14 |
|---|---|---|---|---|---|---|---|
| Deactivated 141 | {CUR} 20a, 220 | | Adjust CUR 100 | (blank) | "CUR" | <CUR> | "AUTO" |
| Adjust CUR 100 | {↑} 18a | Increment <RATE> | Adjust CUR 100 | (blank) | "CUR" | <CUR> | "AUTO" |
| Adjust CUR 100 | {↓} 18b | Decrement <RATE> | Adjust CUR 100 | (blank) | "CUR" | <CUR> | "AUTO" |
| Adjust CUR 100 | {Go/Pause} 16a | Record <CUR> I | Deactivated 141 | <EVENT> | <PACE> | <SIZE> | "AUTO" |
| Adjust CUR 100 | {Stop} 16b | Abort Change | Deactivated 141 | <EVENT> | <PACE> | <SIZE> | "AUTO" |

FIG. 20: Adjust CUR: Auto Plan Only, Deactivated Only; Range 0-999

| Old State 141 | Keys | Actions | New State 141 | Display 11 | Display 12 | Display 13 | Display 14 |
|---|---|---|---|---|---|---|---|
| Deactivated | {Go/Pause} 16a | (OPERATE) | Activated | (blank) | "0" = <TIMER> | "0" = <CNT> | *"PACED"* |
| Activated | {Go/Pause} 16a | | Paused | (blank) | "WAIT" | <CNT> | "PACED" |
| Paused | -- | | Paused | (blank) | "WAIT" | <CNT> | "PACED" |
| Paused | {Go/Pause} 16a | (OPERATE) | Activated | (blank) | <TIMER> | <CNT> | *"PACED"* |
| Activated | -- | (OPERATE) | Activated | (blank) | <TIMER> | <CNT> | *"PACED"* |
| Activated | {Stop} 16b | | Deactivated | (blank) | <PACE> | (blank) | "PACED" |

FIG. 21: Basic PACED operation

| Old State 141 | Keys | Actions | New State 141 | Display 11 | Display 12 | Display 13 | Display 14 |
|---|---|---|---|---|---|---|---|
| Deactivated | -- | | Deactivated | <EVENT> | <PACE> | <SIZE> | <PLAN> |
| Deactivated | {Go/Pause} 16a | (OPERATE) | Activated | <EVENT> | "0" = <TIMER> | "0" = <CNT> | *<PLAN>* |
| Activated | {Go/Pause} 16a | | Paused | <EVENT> | "WAIT" | <CNT> | <PLAN> |
| Paused | -- | | Paused | <EVENT> | "WAIT" | <CNT> | <PLAN> |
| Paused | {Go/Pause} 16a | (OPERATE) | Activated | <EVENT> | <TIMER> | <CNT> | *<PLAN>* |
| Activated | -- | (OPERATE) | Activated | <EVENT> | <TIMER> | <CNT> | *<PLAN>* |
| Activated | {Stop} 16b | | Logging | <EVENT> | "LOG?" | <CNT> | <PLAN> |
| Logging | {↑} 18a | Increment <CNT> | Logging | <EVENT> | "LOG?" | <CNT> | <PLAN> |
| Logging | {↓} 18b | Decrement <CNT> | Logging | <EVENT> | "LOG?" | <CNT> | <PLAN> |
| Logging | -- (till timeout) | | Deactivated | <EVENT> | <PACE> | <SIZE> | <PLAN> |
| Logging | {Stop} 16b | Log <CNT> and <PACE> for the <EVENT> in Behavior Records for the selected <USER> | Deactivated | <EVENT> | <PACE> | <SIZE> | <PLAN> |

FIG. 22: FIXED, AVG, AUTO Operation

| Old State 141 | Keys | Actions | New State 141 | Display 11 | Display 12 | Display 13 | Display 14 |
|---|---|---|---|---|---|---|---|
| Activated | -- | | Deactivated | -- | <PACE> | <SIZE> | "ALERT" |
| Deactivated | {Go/Pause} 16a | (OPERATE) | Activated | -- | "0" = <TIMER> | "0" = <CNT> | *"ALERT"* |
| Activated | {Go/Pause} 16a | | Paused | -- | "WAIT" | <CNT> | "ALERT" |
| Paused | -- | | Paused | -- | "WAIT" | <CNT> | "ALERT" |
| Paused | {Go/Pause} 16a | | Activated | -- | <TIMER> | <CNT> | *"ALERT"* |
| Activated | -- | (OPERATE) | Activated | -- | <TIMER> | <CNT> | *"ALERT"* |
| Activated | {Stop} 16b | | Deactivated | -- | <PACE> | <CNT> | "ALERT" |

FIG. 23: ALERT operation

METHOD AND DEVICE FOR MODIFYING BEHAVIOR

This application claims the benefit of U.S. Provisional Application No. 60/032,109 filed on Dec. 5, 1996, for which the applicant hereof is the sole inventor.

BACKGROUND OF THE INVENTION

This invention relates generally to the field of behavior modification and more particularly, but not by way of limitation, to an improved method and device for modifying the behavior of individuals, specifically to provide a flexible, option-filled, method for the individual to select which operational mode best suits his particular needs in modifying that behavior.

For clarity of description, dietary behavior and its modification, such as to achieve weight loss, will be described in detail, though it is to be understood that the novel modification process of the present invention is adaptable for dealing with any undesirable behavior patterns such as, but not be limited to, eating, smoking, consumption of alcohol, and addictive drug use.

The *Journal of the American Medical Association* (JAMA) recently published the results of a long-term study ("Increasing Prevalence of Overweight Among U.S. Adults", The National Health and Nutrition Examination Surveys, 1960 to 1991, Kuczmarski, et. al., JAMA, Jul. 20, 1994—Vol. 272 No. 3, Pg. 205–211) documenting a dramatic 8% increase in the prevalence of overweight adults 20 years of age and older in the last decade. The most recent 1991 data from that study indicates that 33.4% of U.S. adults were estimated to be overweight. Based on 1990 Census data, about 60 million people fall into this category. This study noted an increase of an average of about 8 pounds per adult over the 1980's. These studies consider "overweight" as approximately 124% of the desirable weight for men and 120% of the desirable weight for women. There are many other persons who, though not overweight according to this criteria, are concerned about losing weight or maintaining current desired weight. Losing and maintaining a desired weight has been a major concern and challenge to a majority of people in this health-conscious society.

To this challenge, many commercial weight-loss regimens have appeared in the marketplace. Some of the more familiar include (1) eating plans which offer prepared meals, which are purchased from the plan provider, and are designed to limit the caloric intake of participants. These plans require strict adherence to the regimen; (2) drug-based weight loss products, which are intended to curb the appetite and typically include high doses of caffeine or other stimulants which may have major, possibly toxic or adverse, side effects; (3) diet supplements which, when taken, operate as a meal substitute and ostensibly provide needed nutrients while also curbing one's appetite; and (4) quick-fix fad type menus or crash diets which are designed to restrict an eater's intake for a specified period of time and offer quick weight loss as the result. The problems with these regimens are that they are often costly, restrictive, painful, conspicuous (particularly when in use), exploitative, difficult to use, or lack flexibility.

The fact that there are so many approaches to weight control is a testament to the general futility and temporary nature of these plans. The resulting weight loss is generally only temporary. In the absence of some significant and permanent change in behavior, which was what put the individual in his overweight condition in the first place, the individual will generally lapse into his prior familiar routine and re-gain the weight so painfully lost. Though some plans are successful for some people, no one plan has been found to yield success for all.

Behaviorists continue to study eating habits of people in an effort to determine how best to handle and treat the obese and overweight. What the studies have found is that heavy people not only eat too much, they eat too fast. As a result, they are not as quickly satiated as those who eat more slowly, in an evenly paced manner. To help the overweight lose weight, behaviorists believe that attenuating the eating speed of the overweight will lead to a chain of actions which ultimately will lead those overweight individuals to satiate more quickly than before and thereby consume less. Less food consumed will result in weight loss. For example, see *Weight Control, The Behavioral Strategies*, Michael D. Lebow, John Wiley & Sons: New York (1981), p. 132–139; "Eating Behavior in Obese and Normal Weight 11-Year-Old Children", *International Journal of Obesity* (1992), Vol. 16, p. 355–360, Barkeling, et. al.; "Relationship Between Eating Rates and Obesity", *Journal of Consulting and Clinical Psychology* (1975), Vol. 42, No. 2, p. 123–125, Gaul, et. al.). Generally, it has been found that overweight individuals, by eating faster, take more bites or mouthfuls than non-overweight individuals. This has lead to the popularization of the rubric "bite counting" with its underlying presumption that, if a person bites less, they will eat less. Bite counting, without a rhythm (pace) to the sequential bites, does little to alter the eating habits of fast eaters and nothing to satiate them during a meal. In fact, it can be counter-productive leading only to a final bite count realization after ingestion of a large meal and nothing more. Also, bite counting is quite difficult to maintain in a social setting, during conversation, and without some assistance to tally the bites.

Though the tests described in the articles mentioned above are not conclusive, they tend to lean favorably toward the conclusion that eating too fast can lead to delayed satiability which, in turn, leads to eating more for satiation. In other words, the simple truth to weight gain or loss is, the less one eats, the more weight one loses and the more one eats, the more weight one gains. There is an direct relationship between quantity eaten and weight gained or lost. Bite counting, without pace alteration, does little to alter one's lifelong eating behavior and, consequently, will not result in the desired weight control, be it loss or maintenance.

Some relevant prior art patents which have addressed weight control include U.S. Pat. No. 5,398,688 issued to Laniado for METHOD, SYSTEM, AND INSTRUMENT FOR MONITORING FOOD INTAKE, U.S. Pat. No. 5,233,520 issued to Kretsch for METHOD AND SYSTEM FOR MEASUREMENT OF INTAKE OF FOODS, NUTRIENTS, AND OTHER FOOD COMPONENTS IN THE DIET, U.S. Pat. No. 4,652,241 issued to McCarty for PLANNING AND CONTROL SYSTEM FOR REGULATING FOOD CONSUMPTION, and U.S. Pat. No. 4,218,611 issued to Cannon for METHOD AND APPARATUS FOR CONTROLLING EATING BEHAVIOR. Though well conceived, well-intended, and, in some cases, positive results have been achieved, none of these prior art methods and devices have been found to significantly alter one's eating behavior in such a manner as to permit the dieter virtually unlimited control of his daily dietary routine and still lose or maintain a desired weight.

The method described in the Laniado patent attempts to limit a dieter's daily food intake by clinically monitoring the dieter over a period of time, establishing and measuring a physiological variable to generate a relationship between that variable and that of the dieter's rate and/or amount of food ingested, calculating a maximum eating time to ingest a pre-determined amount of food, and providing a indicator, such as an alarm, to the dieter to stop eating when the eating time has lapsed. Though intended to limit food intake, the cause and effect of this method could easily be to force the dieter to eat faster rather than slower in order to finish before the alarm sounds. The Laniado patent does not address the overall issue of satiability and behavior modification as they relate to one another. Though this method scientifically determines a quantity and duration for ingestion, it does not address the critical components of eating habits, particularly the pacing of one's eating. This method also is not supported by literature on satiation, such as "The Role of the Gut in Regulating Food Intake in Man" Nicholas Read, Stephen French, and Karen Cunningham, *Nutrition Reviews*, Vol. 52 No. 1, January 1994, where it is shown that the subject will achieve ". . . satiety 35 minutes before any lipid was evident in circulation."

The method disclosed in the Kretsch patent provides an interactive computerized dietary measurement system which measures weight, nutrient value, and dietary component of all food items stored in the computer system data base. It is used to collect, process, and summarize all dietary information for the dieter so that the dieter may maintain a proper nutritional dietary regimen. Like the other prior art patents, this method fails to account for eating behaviors and their modifications. While it may be an excellent information source for a food's nutrient value, it will not alter one's method of eating food.

The system of the McCarty patent is a daily planner which includes a listing of a dieter's daily pre-determined intake and permits the dieter to manipulate any individual food group/item to any pre-selected meal time. The dieter can eat all the foods selected for that day in any sequence preferred. He must select the regimen, consult the regimen, and adhere to the pre-set regimen. This prior art patent merely directs a person to eat no more than is allowed by the plan and does nothing to alter eating behavior. These patents teach regimens that are particularly difficult to apply in restaurants and social situations with unusual foods.

The method and apparatus taught by the Cannon patent focuses on altering a dieter's eating behavior by having the dieter pre-select the number of bites or mouthfuls to be taken during a given meal, taking each bite as the apparatus is activated by the user to indicate that a bite is being taken, chewing each bite to a pre-set pre-determined cadence signal emitted by the apparatus, the chew signal, and taking the next bite when a completed-bite signal is generated after a pre-set number of chew signals have been generated. By this method, if the dieter has not finished chewing his bite when the bite signal is activated for the next bite, the dieter ostensibly has taken too large a bite portion and must reduce the next portion accordingly. The pre-set bite amount is established by the dieter after evaluating his prior eating habits, namely bite counts, per meal over a period of time such as three to seven days. After the average has been established for each meal, one bite count is subtracted when using the apparatus. As each bite is taken, the dieter must manually activate a bite counter by pressing a key on the apparatus which then visibly increments and displays the bite count while the key remains depressed. For as long as the key is depressed, the chew signal and bite signal remain deactivated. These signals begin anew after the key is released. Manual operation also provides a modicum of exercise behavior. When the counter displays the pre-set bite count, the dieter should stop eating.

The dieter is accorded 25 chews for each bite. Each chew is 0.20 seconds in duration with a 0.65 second non-chew period resulting in 0.85 seconds between chews. The duration of the chew can be up to 0.50 seconds with a 0.65 second non-chew period or 1.15 seconds between chews. Total time between bites, therefore, can range from 21.25 seconds to 37.50 seconds. The method is chew-oriented with no deviation for chew times (i.e., chew and non-chew period) other than that which is ascribed above. Intervals between bites is as indicated. There is no teaching to vary the chew pace, or the bite pace, any more than the deviation ascribed above, nor is there any means to effect such variation. There is no means associated with this apparatus which facilitates a pause between bites. Moreover, chew counting is more onerous than the previously described bite counting.

Most importantly, vesting control of the chew and bite signals in the dieter through manual operation while eating, depressing, and releasing the key undermines the entire process of attempting to change behavior. Sequential bites, the bite pace, will not be constant but will rely on the dexterity, speed, and, most importantly, the will of the dieter to activate and restart the chew/bite sequence. If the dieter does nothing when the bite signal activates or if the dieter acts to deactivate all signals, the process to change behavior is virtually aborted. Any benefits to be derived from use of the Cannon apparatus because of the dieter's unlimited control are negated.

Though suited for the intended purpose, this prior art patent lacks flexibility and automation, and is too rigid, regimented, and is too conspicuous. It directly teaches the dieter to be rigidly consistent (i.e.; to eat in the same place everyday; to use the same standard settings and utensils, always to use the same settings and utensils even for food normally eaten without utensils, and to eat without distraction or interruption). The apparatus is taught to be visible, to psychologically underscore for the user the importance for strict adherence to its signals, and to be manually operated. These features of visibility and manual operation enhance the significance and importance of the eating behavior and are alleged to facilitate its modification, but, in the process, deprive the invention of flexibility. It also does not possess any other features or options that an individual user may select which, in the user's opinion, are best suited to his needs for behavior modification.

In summary, this prior art patent cannot accommodate the lifestyles of the majority of people in today's fast-paced society; those with a need for an easy-to-use but flexible weight control system. It purports to control rather than modify behavior. Moreover, the key operation which abates all signals while depressed and continues the bite signal until depressed fails to provide that degree of automation necessary to overcome the dieter's temptations and to modify behavior. Manual operation, which is key to this apparatus, undermines its usefulness. A device without that degree of control, which is more automated, and which provides for greater flexibility will provide the greatest benefit to the user.

Though not related directly to dietary consumption, U.S. Pat. No. 4,853,854 issued to Behar describes a behavior modification device suited primarily to modifying addictive behavior, smoking in this case, and to assisting a user in withdrawal therefrom but which may be suited to modify other undesirable forms of behavior. The device contains a microprocessor which generates a personalized withdrawal program suited to the user for the user's addictive habit. The microprocessor is programmed in read-only memory with the specific control program for a particular addictive habit.

When activated the device establishes a baseline phase for the modification process. Each time the user engages in a behavior sequence (such as smoking a cigarette), he informs the device which records the time of the behavior sequence occurrence. After an initial baseline phase of several days, a withdrawal regimen is personalized for the user. The device thereupon signals to the user when he may engage in that behavior sequence and its quantity or dosage.

The Behar apparatus is not multi-user oriented and focuses on when to engage in a behavior sequence and it dictates the quantity (i.e. how many cigarettes). It is not flexible, except that it may adjust a withdrawal regimen based on a user engaging in behavior sequences not signaled. It does not accord a variety of processes from which a user may default, select, or have automatically selected. Most importantly, it does not focus on the primary behavior modification facet, that of pacing the behavior actions which comprise the behavior sequence (i.e., the rate at which the user would "puff" the cigarette) as does the present invention.

What most people want is a way to easily integrate weight reduction and control in their lives with few changes, with significant flexibility to accommodate to their lifestyles, and as effortlessly as possible. They want an easy-to-use behavior modification system. They also want the flexibility to go out for dinner with others, to eat from the same menu, to eat the same foods, all the while eating less in the process. Above all, they would like to avoid the use of drugs in their selected weight control regimen. They commonly don't want to publicly draw attention to their dietary efforts. They generally don't want, or find it difficult, to exercise more; if they exercise at all. Given these realities, the best approach for weight control must focus on reduction in the amount of food to be consumed as effortlessly, flexibly, and inconspicuously as possible.

What the public desires and which the prior art patents and publications have failed to provide is to enable a user to control the quantity or intake of food without invoking the strict discipline of a fad diet, supplements or substitutes, exotic foods, or an expensive eating plan, and for such quantity to be controlled while permitting an individual to eat normally, that is, the normal menu items, anywhere, at any time. What also is needed if for such quantity of food intake to be controlled, unobtrusively and as inconspicuously as possible, and for such quantity of food intake to be controlled while further according the individual a high degree of flexibility in his daily dietary pursuits. The method and exemplary apparatus of the present invention satisfies these long-felt and long recognized needs of the public

SUMMARY OF THE INVENTION

For explanation purposes only, and not by limitation, the descriptions which follow relate to modifying eating behavior.

The present invention contemplates being embodied in a small, hand-holdable, unobtrusive device. Contained within such device and coupled together is a control means, such as a microprocessor, a memory, an input means, an output means, one or more applications to establish a control program suited to a particular user's preferred method of modifying his behavior, and a means for adjusting a control program manually or automatically. A control program is characterized by a parameters set, comprising one or more parameters wherein each parameter may adopt a plurality of discrete values.

In using the device, a user may accept a defaulted parameter set, or modify the defaulted parameter set. The parameter set then directs the device to operate using a specific modification methodology embodied by a "control program". In its most basic terms, a control program consists of a quantity or number associated with the time or interval in between behavior actions, referred to herein as pace. When activated, the device tracks time and, after a designated period, 45 seconds for example, signals to a user to engage in a behavior action. The device repeats this process, every 45 seconds in this example, signaling to a user that he may engage in the behavior action.

In more sophisticated control program operations, the device is capable not only of tracking the pace, but also the number of behavior actions planned for that behavior sequence, and the actual number of behavior actions which occurred. When the planned number is reached, a second output signal alerts the user that he has reached his limit and should stop. If the user continues past the designated number of behavior actions, a third output signal is generated alerting the user that he is not following the established planned number of behavior actions. When the user finally deactivates the device, it may record the actual number of behavior actions as part of the parameter set. In substantially each of these control program modes, the parameter set may be recorded, stored, and retrieved for future reference, use, and establishment or modification of future control programs. The establishment and modification of the parameter set may be manually effected or automatically performed depending on which control program is involved.

In a more enhanced mode of operation, a user may establish a specific control program to follow, referred to as the "automatic plan". To select this control program, the user sets his objectives by entering data into "objective parameters" contained within the device. These objective parameters consist of a "goal" parameter and a "rate" parameter. On an approximately daily basis, the user also enters a current physical parameter, referred to as "current". The objective parameters may include but not be limited to a variety of physical attributes that give the device feedback as to the success of the current parameter set as they relate to the control program. For a given use of the device, the user should select a single physical attribute or single combination of attributes to which the objective parameters will relate. By way of example only and not limitation, if weight or fat loss is the goal, the objective parameters may consist of one of the following: (a) body weight (pounds or kilograms), (b) waist measurement, (c) percent body fat (derived from a fat-measuring scale or device), or (d) a combination of a, b, and c. These values are used for the "current" and "goal" parameters directly, while the "rate" parameter would be units to be lost or gained per week. So if the "current" and "goal" parameters are body weight in pounds, the rate would be the number of pounds to be gained or lost per week. The objective parameters are processed by a microprocessor within the device and stored in the user's personal record held by a memory within the device. After accepted, the data from the objective parameters is conveyed by the microprocessor to control program parameters. This establishes a control program based on the user's personally identified and selected objectives. When this automatic control program is initiated, the user will enter the "current" parameter, by way of example only, for approximately a week to determine a baseline for operation. Thereafter, the control program is modified based on physical progress as compared with the plan as embodied by the objective parameters.

In some modes of operation, there is substantially a different control program for each plan parameter for each user for each behavior sequence. In these modes of operation, modifications also may be manually effected or automatically performed.

A more detailed summary of the invention follows. In the preferred embodiment, the device provides an LCD display with multiple output elements, and an input keypad with multiple user-operable buttons, or keys. In its most simplified form, the device, when activated, generates a first output signal, which may be any one or more types of output, such as, without limitation, audible, visible, or tactile, or any combination thereof, every N-seconds. In a dietary behavior modification use, the first output signal informs an eater to take the next mouthful of food. Within N-seconds, the eater should have completed and swallowed that mouthful, should have had ample "dead time" before the next first output signal. If the eater has not completed that mouthful of food, he should do one of the following;

(a) use less food to make a mouthful;
(b) increase the time between bites so that he can effectively chew the mouthful, swallow it, and have ample "dead time" between bites; or
(c) do not take another bite at this next first output signal, and wait for the subsequent first output signal, affording adequate "dead time". In this case, the mouthful counts as two.

In a slightly more complex mode of operation, the device also maintains a planned number of times that the behavior action should occur, the "size". After the device signals behavior actions, or bites, equal to the size, a stop-eating output signal, the second output, is generated signifying to the eater that this is the last bite, and that he should then stop eating and press a STOP key on the device after taking this bite. If the user does not press the STOP key after the second output signal, the unit will continue to pace bites using the overeating output signal, the third output, indicating that these follow-on bites are excess and the user is overeating. As previously mentioned, the operation of the device is referred to as the control program, and the corresponding behavior of the user is referred to as the behavior sequence.

The control program relates to a behavior sequence that generally entails, but is not limited to, a behavior action, and the number of occurrences of this action has both a parameter which indicates the planned number of behavior actions (the "SIZE",) and a parameter which relates to the actual number of behavior actions (the "actual behavior count", or "CNT"), and time intervals until the next behavior action, such as N-seconds, referred to as PACE. In its most basic mode, only PACE is used in the control program. In the next level of complexity, PACE and SIZE generally make up the parameters that are used by the control program corresponding to a behavior sequence, and CNT is collected in the Behavior Records for each meal and user.

Contained within the memory of the device are, but are not necessarily limited to, Behavior Records and control program parameters corresponding to behavior sequences for the three basic meals and three after-meal snacks, plus one "generic" behavior sequence that can be applied to special eating plans as well as other behaviors, such as, but not limited to, drinking alcoholic beverages and cigarette smoking. For clarity, the specific term "meal" will be applied henceforth for these behavior sequences. For each, the PACE, SIZE and CNT are recorded and stored by the device. In addition, these parameters are recorded for the prior week of meals. A given PACE and SIZE comprise a "meal plan". Generally, PACE and SIZE can be constant, can be modified, can be averaged, can be programmed, and can related to any behavior modification program as its behavior sequence. In the most basic meal plan, SIZE is not limited, and therefore, the second and third output signals are not generated. In more advanced programs, generally, SIZE and PACE are fixed or are calculated based on the user's eating history record.

A control program relating to a given behavior sequence can be modified by a user. A user can change the PACE to a greater or lesser period of time and can change the SIZE to a greater or lesser quantity or number. This can be done for any meal based on a user's preferred method of modifying his behavior. In this modified use, the user can record and store the parameters relating to any given meal in a memory contained within the device. When the user next engages in that meal, the user's parameter set will be retrieved for that meal and it will activate and run his preferred method of modifying his behavior. The user may select the next meal or the meal may be incremented automatically by the device such that, when the user activates the program, the device will retrieve the user's programmed profile for the next meal and run it with the meal.

A user can also allow the device to average his PACE or SIZE over a pre-set period of time and establish those averages as the new parameters for the program.

In its more sophisticated mode of operation, a user may enter a user identifier, a meal, a plan, the PACE, the SIZE, the user's desired goal(the "Goal" parameter), the user's desired rate of attaining the desired goal (the "Rate" parameter), and the user's current physical condition (the "Current" parameter). All such data entered is stored in memory associated with that user for that plan for that meal, and in most cases, defaults exist for these parameters. As such, the control program is user-specific, event-specific, plan-specific, and method-specific. In the preferred embodiment, more than one user can use the same device, albeit, not at the same time. A "Daily Record" is kept of the user's current physical condition as described by the "Current" parameter and the parameters relating to that user's behavior sequence for a particular meal, that is, the SIZE, PACE, and CNT. The user may, when undertaking a particular meal, adjust many of the parameters. The user may also set the device to automatically make such adjustments and devise a behavior sequence to associate with any given meal based on the historical record corresponding to that user's behavior.

When using the device for behavior modification in the more sophisticated mode, much like in the simplified mode, a first output signal is generated indicating the next repetition may commence. When the planned behavior count, or SIZE, is reached, a second output signal is generated. Should the user continue past SIZE actions, a third output signal is generated for each such behavior action conveying to the user that he is not adhering to the planned SIZE.

At any given time, a user can pause the program and alter SIZE, PACE, or CNT; or may alter or modify many other parameters.

The device is configured with an input-output interface suited for downloading stored parameters or for uploading data or a new control program into the device. This interface can be connected to a personal computer (PC) or other "host" device using a cable between the device and a port of the host. Additional application programs can be used to analyze the user's eating history and recommend control programs using more advanced or different methods than those preloaded into the device.

Accordingly, several objects and advantages of my invention are:

To modify an individual's consumption or other behaviors.

To provide an easy-to-use automatic device and method suited to modifying an individual's consumption or other behaviors.

To provide flexibility of use, in method and device, necessary to accommodate varying lifestyles.

To provide an unobtrusive and inconspicuous method and device for modifying an individual's consumption or other behaviors.

To provide a non-arduous, effortless method and device to an individual in pursuit of that individual's goal.

To provide a non-arduous, effortless method and device for modifying an individual's consumption or other behaviors.

To permit an individual to engage in limited undesirable behavior while pursuing his ultimate goal to modify that behavior.

In a dietary use, to permit an individual to consume any food type while pursuing that individual's weight control goal.

In a dietary use, to permit an individual to consume any food type while modifying that individual's consumption behavior.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For an understanding of the nature and objects of the invention, reference should be had to the following detailed description taken in conjunction with the accompanying drawings in which:

FIGS. 9 through 23 are state tables depicting the operation of the invention.

DETAILED DESCRIPTION OF THE PREFERRED EMBODIMENTS

DEVICE OVERVIEW

This section provides a brief overview of the drawings before a more thorough description is attempted as those detailed descriptions require reference to one or more of these figures.

Figure 1:
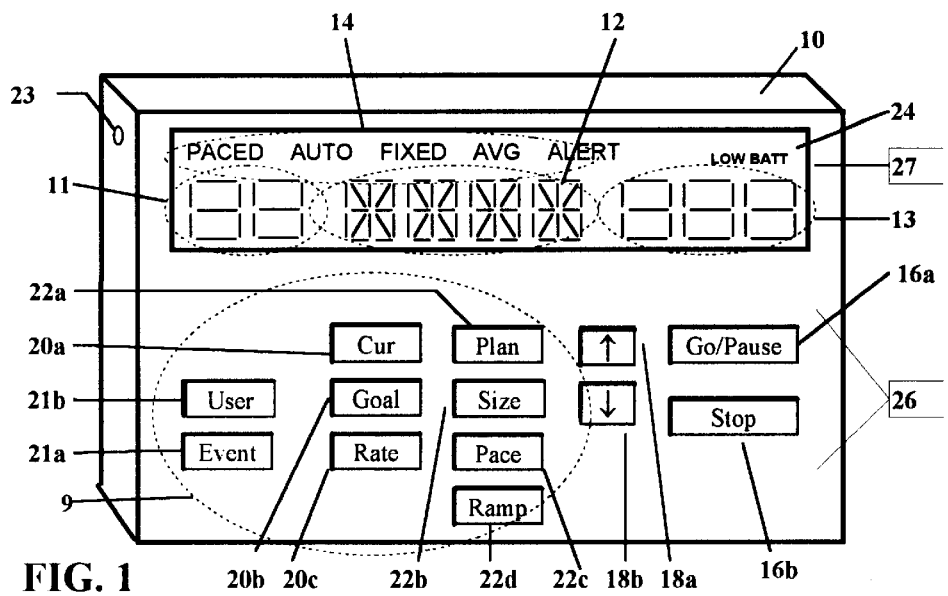
FIG. 1 is a perspective view of a first embodiment of the invention.

First Embodiment (FIG. 1)

FIG. 1 is a perspective view of a first embodiment of the invention. The device 10 is a pager-sized handholdable device, typically suitable for carrying in the user's pocket or by attachment to the user's belt using a belt clip (not shown). Major components include Input Means 26, comprised of parameter select keys 9, Value Adjust Keys 18, and Activation State Keys 16; Display Means 27, comprised of First through Fifth displays 11–15; Memory Means 28 (internal, not shown); Signal Output Means 29 (internal, not shown); Accessory Interface Means 23; and Control Means 25 (internal, not shown)

Figure 2:
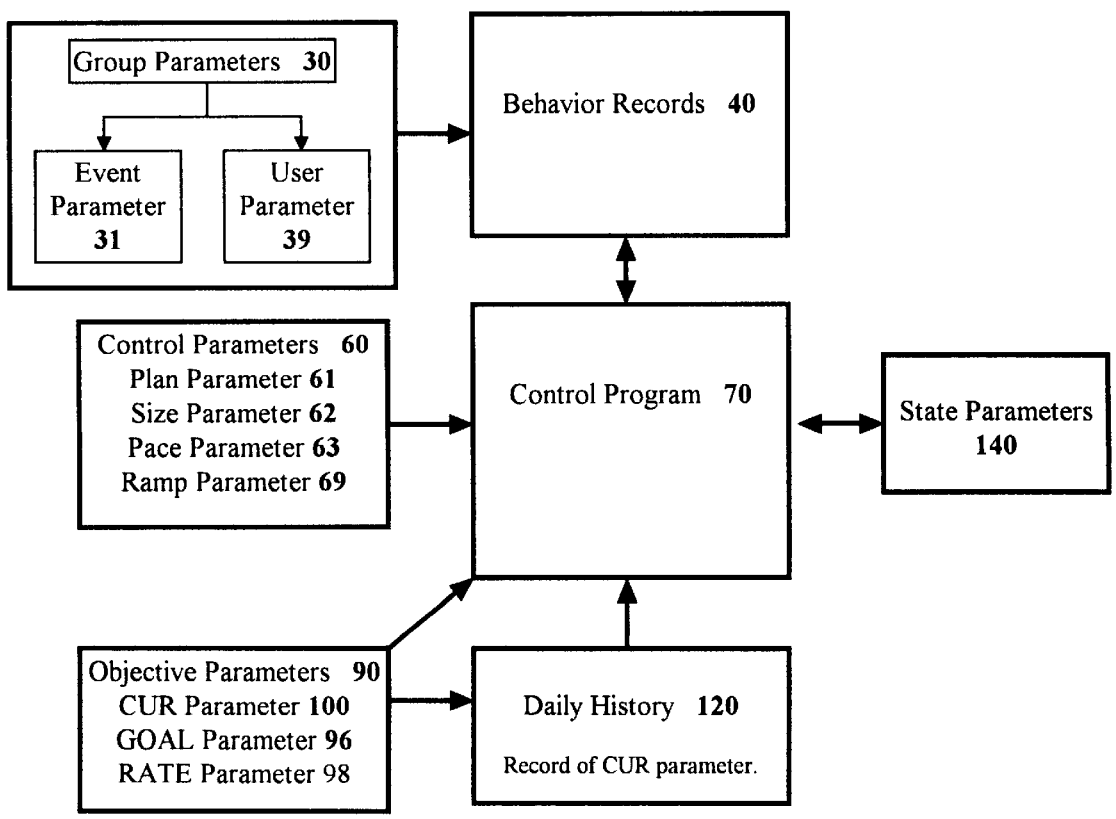
FIG. 2 is a flow chart overview of FIGS. 5–7.

Flow Chart Overview (FIG. 2)

Figure 5:
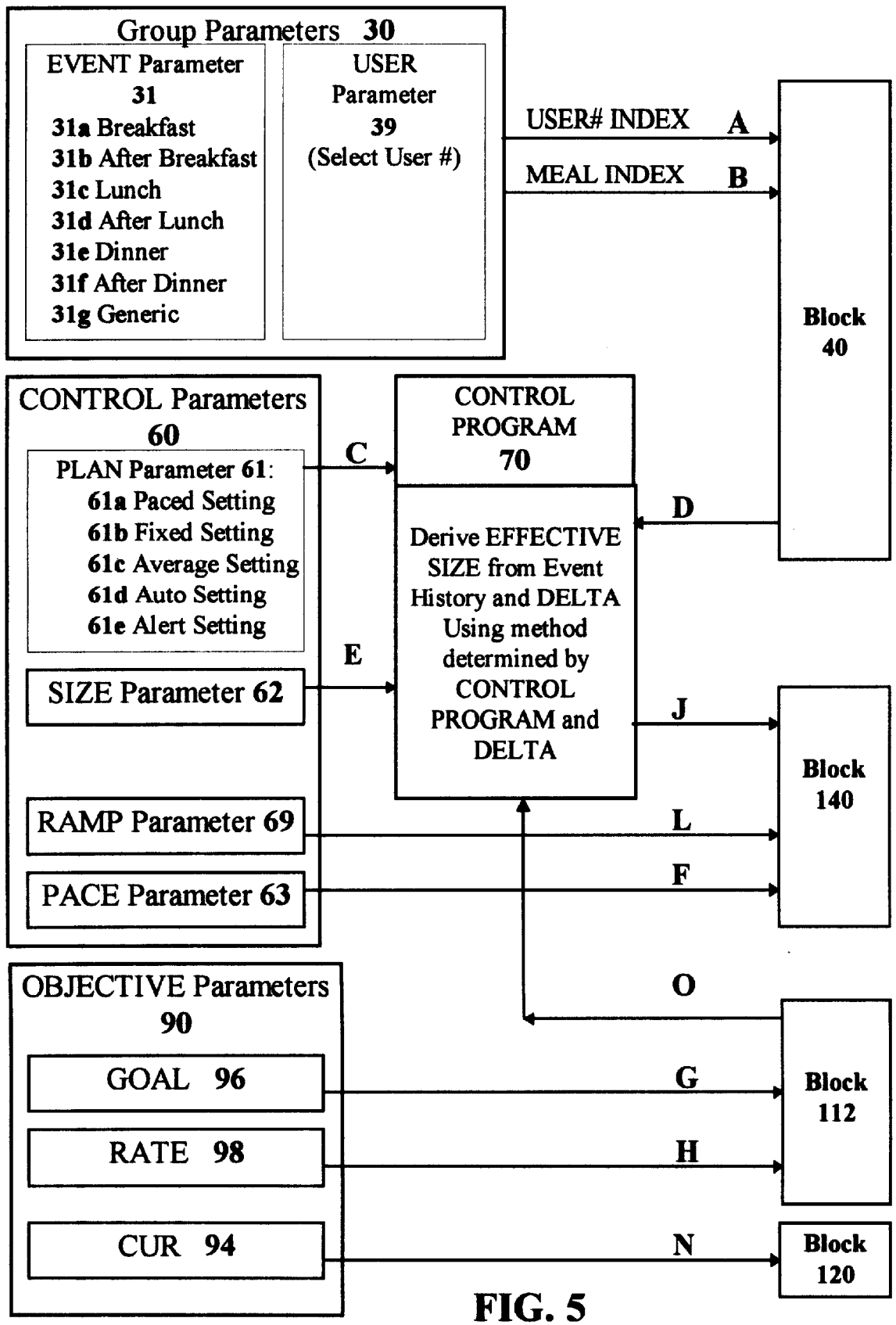
FIGS. 5 through 7 are flow charts depicting the operation of the invention.
Figure 6:
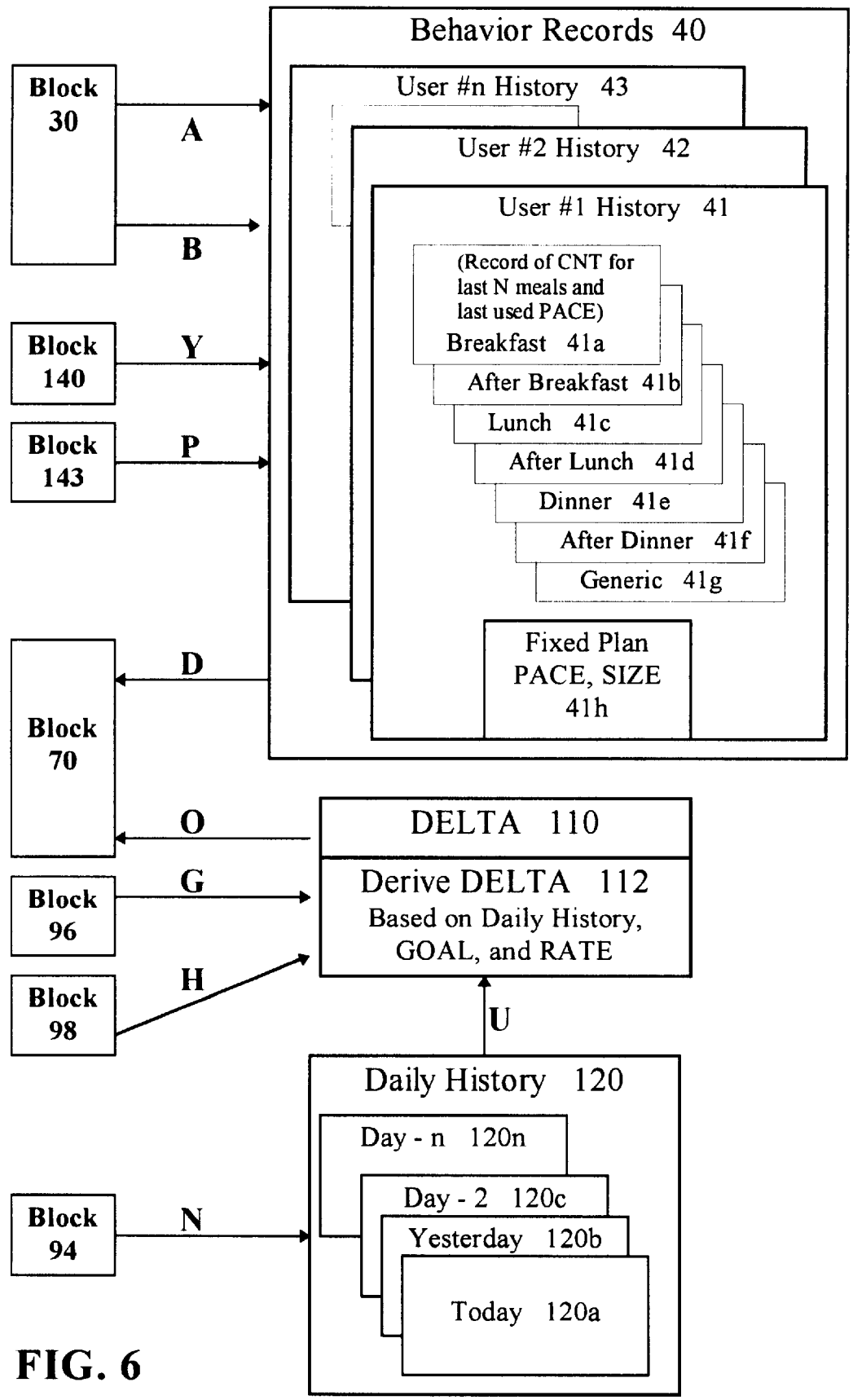
Figure 7:
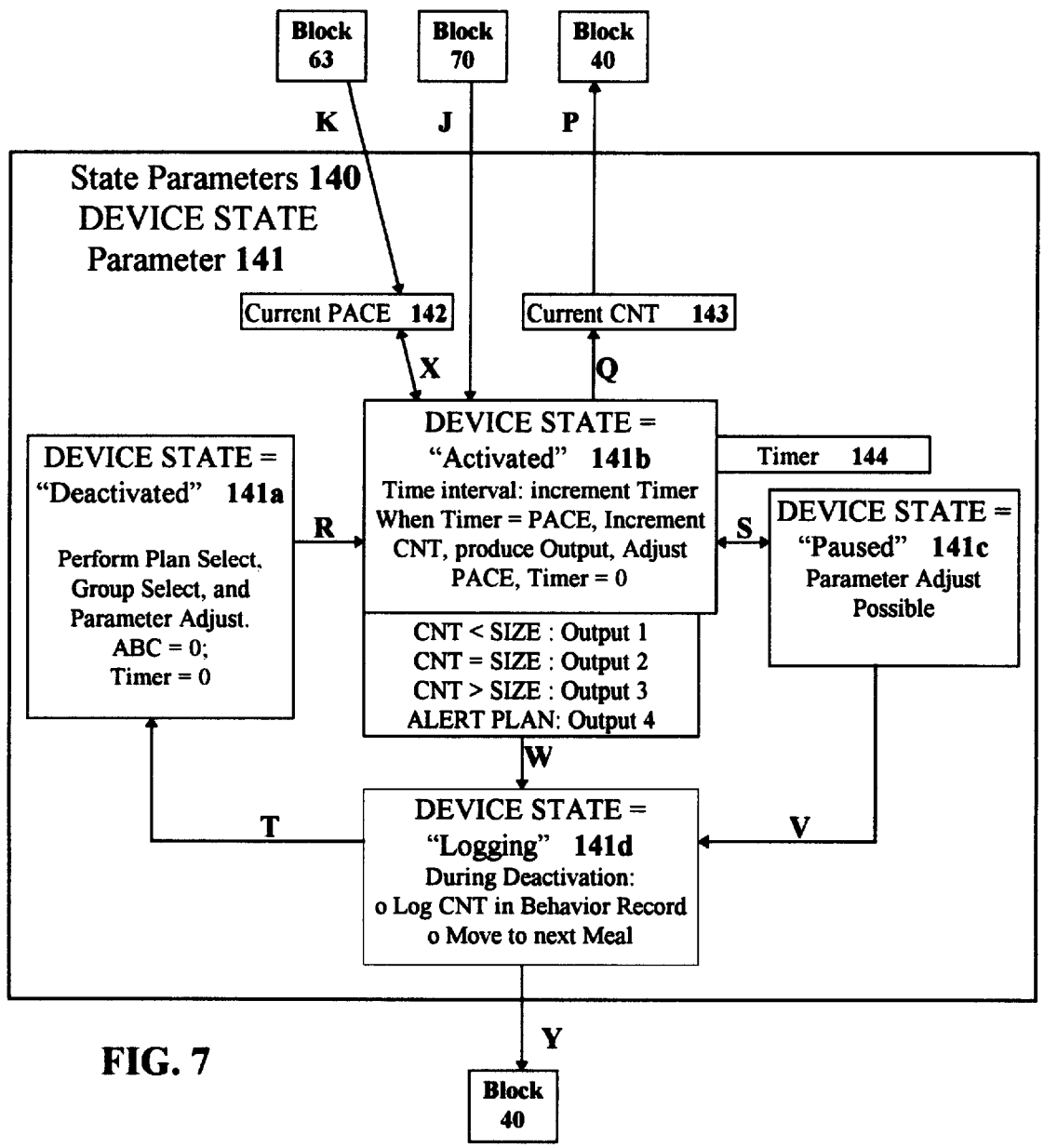

FIG. 2 is a flow chart overview of FIGS. 5–7, and is implemented in the control means 25. Except for Control Program 70, all parameters shown comprise the Parameter Set 50, and direct the operation of the control program.

Figure 3:
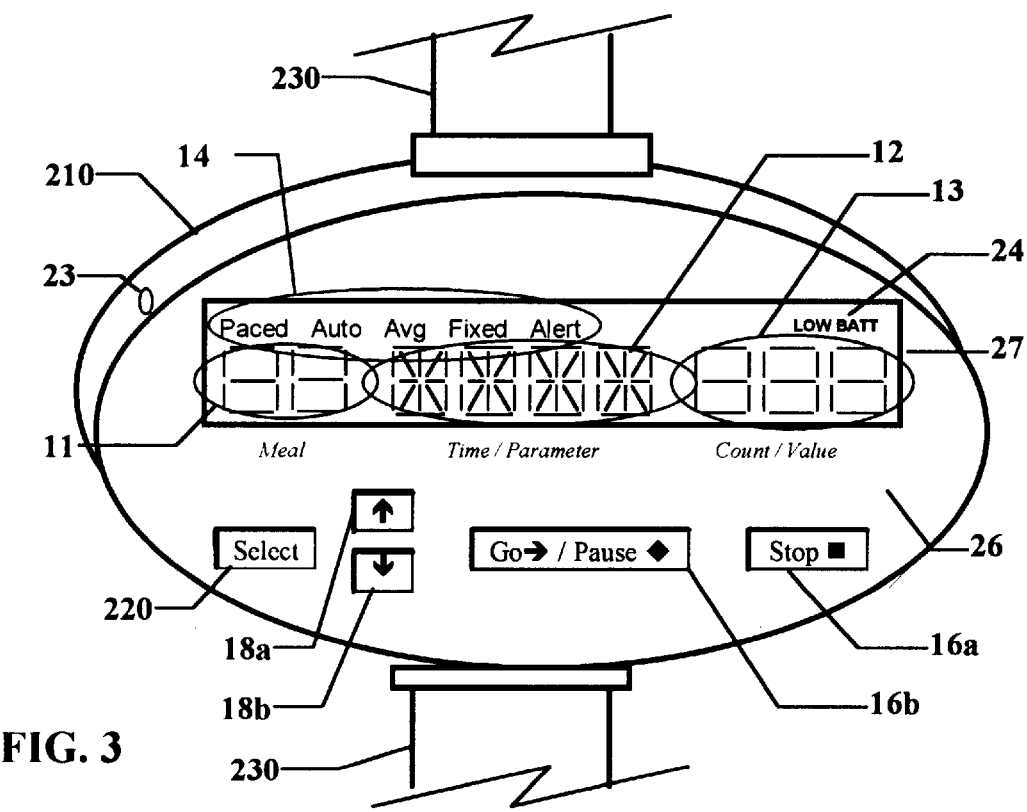
FIG. 3 is a perspective view of a second embodiment of the invention.

Second Embodiment (FIG. 3)

FIG. 3 is a perspective view of a second embodiment of the invention. This embodiment is substantially similar to that of FIG. 1 except that the Parameter Select Keys 9 of FIG. 1 are reduced to a single parameter select key 220. Another change in this embodiment when compared with the First Embodiment (FIG. 1) is the case 210 is a wrist-watch style with wristband 230. The single parameter select key 220 may be applied to the rectagular case of FIG. 1 without using the wrist-watch case 210.

Figure 4:
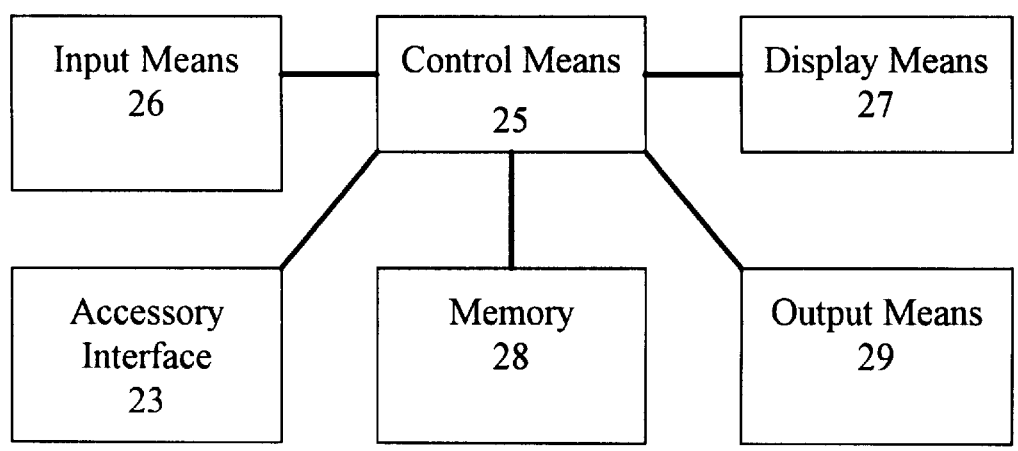
FIG. 4 is a block diagram showing the conventional component parts of the invention.

Basic Block Diagram (FIG. 4)

FIG. 4, a basic block diagram, illustrates the device 10 as including an input means 26, a display means 27, a memory means 28, a signal output means 29, and an accessory interface means 23 each of which is coupled to a suitable data processing means such as a standard microprocessor therein. A battery or other power source, not shown, supplies the electrical energy to operate the device 10.

Flow Charts (FIGS. 5 THROUGH 7)

FIGS. 5 through 7 are flow charts depicting the operation of the invention as directed by the control means 25 and the various parameters that are used in the preferred embodiment. Substantial direction of control and data flow is shown by directional arrows A through Y.

Figure 8:
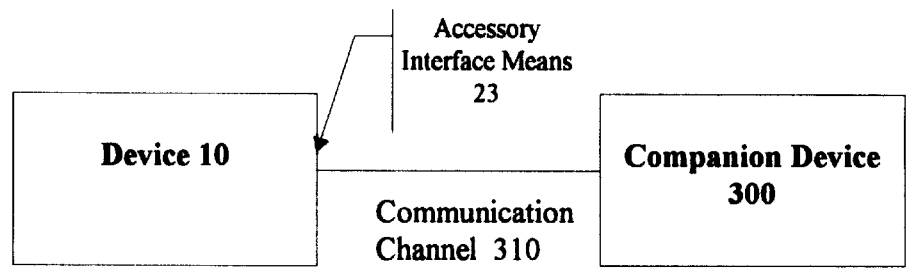
FIG. 8 is a block diagram describing interface with a companion device.

Interface with Host Computer (FIG. 8)

FIG. 8 illustrates connection with a host computer for transferring portions of the Parameter Set. Device 10 provide Accessory Interface means 23 connected to a communication channel means 310 which is in turn connected to a companion device 300.

State Tables (FIGS. 9 THROUGH 23)

FIGS. 9 through 23 reflect state tables as to the operation of device 10. An explanation of the state tables follows. For ease of understanding, the state tables should be viewed simultaneously with FIGS. 1 through 3 and, as necessary for greater detail, FIGS. 5 through 7. Reference characters, where included identify the structure on device 10 or the location in the flow charts representing that state of operation. Words or figures within quotation marks are the actual display entries or values shown on the face of device 10. Abbreviated references have the following meaning:

TABLE 1

STATE TABLE ABBREVIATIONS, FIGS. 9–23

| Abbr. | Meaning | Display |
|---|---|---|
| <EVENT> | EVENT parameter 31 | See TABLE 4 |
| <USER> | USER parameter 39 | Numeric |
| <PLAN> | PLAN parameter 61 | See TABLE 3 |
| <SIZE> | SIZE Parameter 62 | Numeric |
| <PACE> | PACE Parameter 63 | Numeric |
| <RAMP> | RAMP Parameter 64 | Numeric |
| <CUR> | CUR Parameter 94 | Numeric |
| <GOAL> | GOAL Parameter 96 | Numeric |
| <RATE> | RATE Parameter 98 | Numeric |
| <CNT> | CNT Parameter 143 | Numeric |
| <TIMER> | TIMER Parameter 144 | Numeric |
| {GO/PAUSE} | GO/PAUSE Key 16a | |
| {STOP} | STOP Key 16b | |
| {↑} | UP-ARROW Key 18a | |
| {↓} | DOWN-ARROW Key 18b | |
| {CUR} | CUR Key 20a | |
| {GOAL} | GOAL Key 20b | |
| {RATE} | RATE Key 20c | |
| {EVENT} | EVENT Key 21a | |
| {USER} | USER Key 21b | |
| {PLAN} | PLAN Key 22a | |
| {SIZE} | SIZE Key 22b | |
| {PACE} | PACE Key 22c | |
| {RAMP} | RAMP Key 22d | |

DEVICE COMPONENTS

Control Means 25

Control Means 25 may be a conventional microprocessor for running application programs, processing data, and linking user input means 26, display means 27, memory means 28, signal output means 29, and accessory interface means 23. To this end, control means 25 may be any of numerous embedded microcontrollers on the market. These controllers may have the memory 28 as an internal feature, and may provide direct interface to a Liquid Crystal Display (LCD) display 27.

Alternatively, the Control Means 25 may be any logic or electronic circuit realizing the functions described herein.

The control means 25 and memory 28 together implement the Control Program 70 and the Parameter Set 50, comprised of parameters which affect and guide the operation of the Control Program 70.

Input Means 26

Device 10 is outfitted with an input means 26 comprising a number of keys, buttons, or switches (henceforth "keys") which serve to allow the user to select parameters, adjust parameter values or settings, and to control activation of the device. These keys are categorized by use into three major categories, Parameter select keys 9, Value Adjust Keys 18, and Activation State Keys 16.

Parameter Select Keys 9

FIG. 1 shows a first embodiment which features a single Parameter Select key for each parameter. The parameter select keys 9 are typically used during device setup to select parameters for adjustment. Examples of the procedure of adjusting each parameter will be provided later. Generally, however, each parameter select key, when pressed, directs the Control Program 70 to display the related parameter name and its current setting, and allow the user to adjust the current setting.

Group Parameter Keys 21

Group parameter keys 21 associate with the GROUP parameters 30, and consist of the Event Key 21a and User Key 21b.

The EVENT KEY 21a selects the EVENT parameter 31 for adjustment.

The USER KEY 21b selects the USER parameter 39 for adjustment.

Control Parameter Keys 22

Control parameter keys 22 associate with CONTROL parameters 60, and consist of the Plan Key 22a, Size Key 22b, Pace Key 22c, and Ramp Key 22d.

The PLAN Key 22a selects the PLAN parameter 61 for adjustment.

The SIZE Key 22b selects the SIZE parameter 62 for adjustment.

The PACE Key 22c selects the PACE parameter 63 for adjustment.

The RAMP Key 22d selects the RAP parameter 64 for adjustment.

Objective Parameter Keys 20

Objective parameter keys 20 associate with the OBJECTIVE parameters 90, and consist of the Cur Key 20a, Goal Key 20b, and Rate Key 20c.

The CUR Key 20a selects the CUR parameter 94 for adjustment.

The GOAL Key 20b selects the GOAL parameter 96 for adjustment.

The RATE Key 20c selects the RATE parameter 98 for adjustment.

General Parameter Select Key 220

FIG. 3 shows a second embodiment which features a single parameter select key 220. When this key is pressed, each of the available parameters is accessed in sequence. The name of the parameter is shown in Display 12 and the value of the parameter is generally shown in Display 13. See Table 5.

Value Adjust Keys 18

After the parameter is selected using one of the Parameter Select Keys 9 or 220, the Value Adjust Keys 18 are used to adjust the value of the parameter.

The Up-Arrow Key 18a will generally increment the value of the parameter, or scroll up through the valid list of settings.

The Down-Arrow Key 18b will generally decrement the value of the parameter, or scroll down through the valid list of settings.

When the highest or lowest values are reached by using the value Adjust keys, subsequent presses of the Up-Arrow Key 18a or Down-Arrow Key 18b respectively will select the lowest or highest value, respectively.

In many cases, holding the value adjust keys down continuously will result in rapid scrolling through the available values.

After selecting the desired value for a parameter, the GO/PAUSE key 16a is used to indicate that associated parameter should adopt the indicated value. If the STOP key 16b is pressed instead, the parameter does not adopt the new state. If another Parameter Select Key 9 or 220 is pressed, the value is adopted as if the GO/PAUSE key 16a were pressed.

Activation State Keys 16

Activation State Keys 16 associate with the DEVICE STATE parameter 141, and consist of the GO/PAUSE key 16a and the STOP Key 16b. These keys control the value of the DEVICE STATE parameter 141 in a special user-friendly manner, according to the following table:

TABLE 2

DEVICE STATE CHANGES

| Current DEVICE STATE parameter 141 | KEY PRESSED | New DEVICE STATE parameter 141 |
|---|---|---|
| DEACTIVATED 141a | GO/PAUSE 16a | ACTIVATED 141b |
| DEACTIVATED 141a | STOP 16b | DEACTIVATED 141a |
| ACTIVATED 141b | GO/PAUSE 16a | PAUSED 141c |
| ACTIVATED 141b (Paced Setting 61a) | STOP 16b | LOGGING 141d * DEACTIVATED 141a * |
| PAUSED 141c | GO/PAUSE 16a | ACTIVATED 141b |
| PAUSED 141c | STOP 16b | PAUSED 141c |
| LOGGING 141d | GO/PAUSE 16a | ACTIVATED 141b |
| LOGGING 141d | STOP 16b | DEACTIVATED 141a |
| LOGGING 141d | (none) | DEACTIVATED 141a |

Note: When PLAN parameter 61 is set to the PACED setting 61a, pressing STOP 16b once will cause the DEVICE STATE parameter to be set to DEACTIVATED 141a which will discontinue the operation of the device. When PLAN parameter 61 is set to any setting other than PACED setting 61a, then pressing STOP 16b once will cause the device to enter LOGGING setting 141d of the DEVICE STATE parameter 141 and an additional press of the STOP key 16b is required to cause the DEVICE STATE; parameter 141 to be set to DEACTIVATED 141a which will discontinue the operation of the device, or no key press will have the same result. If two STOP key 16b presses are used, then the second press will "log" the CNT parameter 143 in the Behavior History 40 parameter set.

The GO/PAUSE key 16a is also used to select an adjusted value of a parameter as previously described.

Display Means 27

Display Means 27 comprise a first display 11, second display 12, third display 13, fourth display 14, and fifth display 24. The Fourth Display 14 and Fifth Display 24 generally display the same parameters in all modes. The other display elements are covered in specific modes.

Fourth Display 14

Fourth display 14 generally displays the setting of the PLAN parameter 61, according to the following table. Fourth display 14 may be blanked when selected parameters other than the PLAN parameter 61 have been selected for adjustment.

TABLE 3

PLAN PARAMETER DISPLAY

| PLAN parameter | 61 | Display 14 |
|---|---|---|
| PACED setting | 61a | "Paced" |
| FIXED setting | 61b | "Fixed" |
| AVERAGE setting | 61c | "Avg" |
| AUTO setting | 61d | "Auto" |
| ALERT setting | 61e | "Alert" |

Fifth Display 24

The fifth display 24 shows the power status and, if battery-operated, the status of the battery, such as a "battery low" indication Deactivated, Non-Adjust Mode Display When DEVICE STATE parameter 141 is set to Deactivated 141a, and parameter adjustment is not in process, First display 11, Second display 12, and third display 13 display as follows.

First Display 11

The first display 11 generally displays the value of the EVENT parameter 31, unless the PLAN parameter 61 is set to the PACED setting 61a, wherein, first display 11 is blank. First display 11 will show the event according to the following table:

TABLE 4

EVENT DISPLAY

| EVENT parameter | 31 | Display 11 |
|---|---|---|
| BREAKFAST setting | 31a | "B" |
| AFTER BREAKFAST setting | 31b | "AB" |
| LUNCH setting | 31c | "L" |
| AFTER LUNCH setting | 31d | "AL" |
| DINNER setting | 31e | "D" |
| AFTER DINNER setting | 31f | "AD" |
| GENERIC EVENT setting | 31g | "G" |

Second Display 12

Second display 12 displays the numeric value of the PACE parameter 63.

Third Display 13

Third display 13 generally displays the numeric value of the SIZE parameter 62, unless the PLAN parameter 61 is set to PACED setting 61a.

Parameter Adjust Mode Display

When DEVICE STATE parameter 141 is set to Deactivated 141a, and parameter adjustment is in process (i.e. a Parameter Select Key 9 or 200 has been pressed), First display 11, Second display 12, and third display 13 display as follows.

First Display 11

The first display 11 is generally blank during parameter adjustment.

Second Display 12 and Third Display 13

When parameter adjustment is in process, second display 12 displays the name of the parameter being selected and third display 13 displays the value of the parameter, according to the following table:

TABLE 5

PARAMETER ADJUST DISPLAY

| Key Pressed | Parameter Selected | | Display 12 | Display 13 | Display 14 |
|---|---|---|---|---|---|
| USER | 21b | USER | 39 | "USER" | numeric user number | blank |
| EVENT | 21a | EVENT | 31 | "MEAL" | See TABLE 4 | blank |
| PLAN | 22a | PLAN | 61 | "PLAN" | blank | TABLE 3 |
| PACE | 22c | PACE | 63 | "PACE" | numeric value | blank |
| SIZE | 22b | SIZE | ..62 | "SIZE" | numeric count | blank |
| RAMP | 22d | RAMP | 64 | "RAMP" | numeric ramp mode | blank |
| GOAL | 20b | GOAL | 96 | "GOAL" | numeric physical value | blank |
| RATE | 20c | RATE | 98 | "RATE" | numeric change per week | blank |
| CUR | 20a | CUR | 94 | "CUR" | numeric physical value | blank |
| CNT | — | CNT | 143 | "CNT" | numeric count | blank |

Activated, Paused, or Logging Mode Display

When DEVICE STATE parameter 141 is set to Activated 141b, First display 11, Second display 12, and third display 13 display as follows.

First Display 11

The first display 11 generally displays the value of the EVENT parameter 31, unless the PLAN parameter 61 is set to the PACED setting 61a. The exact display is the same as for First display 11 in deactivated mode.

Second Display 12

When the value of the DEVICE STATE parameter is ACTIVATED, the value of CNT parameter 143 is displayed in second display 12. When the value of the DEVICE STATE parameter 141 is PAUSED 141c, "WAIT" is displayed in second display 12. When the value of the DEVICE STATE parameter 141 is LOGGING 141d, "LOG?" is displayed in second display 12.

Third Display 13

Third display 13 shows the numeric value of the TIMER parameter 144.

Memory Means 28

The Memory Means 28 provides non-volatile storage of the Parameter Set and for other working storage for use by the Control Means 25. The Memory Means is preferably implemented using Static Random Access Memory (SRAM) which may be integrated onto the same integrated circuit with the control means 25. In other embodiments, it is also possible to implement the Memory Means as switch settings which rely on physical position to provide parameter settings.

Signal Output Means 29

The Signal output means 29 is used to inform the user that a behavior action can occur. The preferred signal is of a non-disruptive type, such as a vibration or other tactile signal. A light or sound may also be used. For PLAN parameter 61 settings of other than the PACED setting 61a, three types of signals are used. The exact type of signal is based on the relationship between the value of the CNT parameter 143 and the value of SIZE parameter 62. The type of the vibration is according to the following table.

TABLE 6

SIGNAL TYPES

| Parameter Relation | Output Type | Typical Vibration |
| --- | --- | --- |
| PACED PLAN | First Type | Single Pulse |
| CNT < SIZE | First Type | Single Pulse |
| CNT = SIZE | Second Type | Triple Pulse |
| CNT > SIZE | Third Type | Double Pulse |
| ALERT PLAN | Fourth Type | Very long single pulse |

Accessory Interface Means 23

Accessory interface means 23 allows communication between device 10 with another companion device 300 for transferring data retained in memory means 28 to the companion device 300 or for uploading data from the companion device 300. The communication channel 310 used to communicate the data may be one or more physical wires, wireless communication such as infrared, FM, pager, cellular or other communication channel, and it may include other transport protocols such as used on the internet.

PARAMETERS

Data processing means 25 utilizes a Control Program 70 which is affected by data items contained in Memory 28 called "parameters". All parameters are considered to be part of the parameter set 50. Most parameters can be individually selected and adjusted by a user. Some are automatically calculated or modified by the Control Program. All parameters have a default value.

Parameter Categories

In the configuration illustrated in FIGS. 1 and 2 the parameter set 50 is further categorized into four parameter categories, namely GROUP parameters 30, CONTROL parameters 60, OBJECTIVE parameters 90, and STATE parameters 140.

Group Parameters

Within the GROUP parameters 30 there is the EVENT parameter 31 and the USER parameter 39.

Event Parameter

The EVENT parameter 31 generally includes, by way of example only and not limitation, the settings as shown in TABLE 4. All but GENERIC 31g are self-explanatory. GENERIC 31g may be used for modification of other behaviors, such as, but not limited to, limiting the consumption of alcoholic beverages, while still allowing the user to access the meals oriented to control overeating.

User Parameter

The USER parameter 39 specifies the current user of the Device 10. USER parameter 39 settings are identification numbers for example, which have been entered and stored by the respective user in memory 28 as shown in FIG. 4.

Control Parameters

CONTROL parameters 60 is comprised of the PLAN parameter 61, PACE parameter 63, SIZE parameter 62, and RAMP parameter 64.

A user may manually adjust the CONTROL PARAMETERS 60. These parameters also may be automatically established by the device 10 through an program sequence contained within microprocessor 25, as will be explained later in the description of FIG. 6. Based on the multiple parameters selected, defaulted, or automatically chosen, the operation of CONTROL PROGRAM 70 is determined.

Pace Parameter

The PACE parameter 63 can range substantially from 1 to 999, and represents seconds or minutes between signals generated by output means 29. The user is to coordinate his behavior actions so that they occur in synchronization with the signals. PACE parameter 63 can be adjusted separately for each GROUP parameter 30 such as for a particular USER parameter 39 setting and for a particular EVENT parameter 31 (such as a meal). The PACE parameter 63 directs the pace of the signals corresponding to pace of the behavior actions to be performed by the user. For the dietary application, the PACE parameter 63 determines the rate at which mouthfuls of food are to be consumed. If the mouthful first taken is not completely chewed and swallowed when the time for the next mouthful is signaled, the user should decrease the quantity associated with the previous mouthful, increase the PACE parameter 63, or the time interval, or skip that bite corresponding to the overlapping output signal and finish the bite while waiting for an output signal when the user has nothing in his mouth. The default PACE parameter 63 is pre-set for about 45 seconds.

Size Parameter

The SIZE parameter 62, which can range substantially from 1 to 99, and represents the planned behavior count. In the dietary configuration example, the SIZE parameter 62 could be the bite count, mouthfuls, or repetitions of a behavior action, associated with a particular meal as represented by EVENT parameter 31. SIZE parameter 62 can be adjusted separately for each setting of the GROUP parameters 30 so that for a given USER parameter 39 and for a particular EVENT parameter 31 (Meal) the SIZE parameter may be set and stored for future behavior sequences. The SIZE parameter 62 is ignored if the PLAN parameter 61 is set to the PACED 61a setting. The default SIZE parameter 62 is about 20.

Plan Parameter

The PLAN parameter 61 selects the control program to be used in the operation of the device and has a number of settings, as shown in TABLE 3. The PLAN parameter 61, and represents the control program 70 mode to be used in the operation of the device.

Paced Setting 61a

The PACED setting 61a of PLAN parameter 61 selects a control program which incorporates the PACE parameter 63 to establish and execute a CONTROL PROGRAM 70. In this plan, the SIZE parameter 62, or planned number of behavior actions, is ignored. As a result, only the First Signal type (a single vibration pulse, by way of example only and not limitation) is used.

Fixed Setting 61b

The FIXED setting 61b of PLAN parameter 61 has a pre-established PACE parameter 63 and SIZE parameter 62 for each specific EVENT parameter 31. PACE parameter 63 and SIZE parameter 62 may be set by the user and may be adjusted manually using scroll keys 18 or downloaded using the accessory interface 23 of the device 10. Three output signals are generated (See TABLE 6) using the FIXED setting 61b. Any number and type of signals may be generated, however.

Average Setting 61c

The AVERAGE setting 61c of PLAN parameter 61 provides for automatic generation of the SIZE parameter 62 and PACE parameter 63 based on the recent average of the CNT parameter 143, for a given USER parameter 39 and EVENT parameter 31. During the first use of the device in the AVERAGE setting 61c, the device operates the same as when in the PACED setting 61a in that only the first output signal type is given. When the user has completed the behavior sequence (i.e. meal), the STOP key 16b is pressed twice to log the CNT parameter 143 in the BEHAVIOR HISTORY 40, indexed by the USER parameter 39 and EVENT parameter 31.

On the second and subsequent uses of the device 10 when the PLAN parameter 61 is set to the AVERAGE setting 61c, for a given USER parameter 39 setting and EVENT parameter 31 setting, the device generally will provide three signal types, as previously described (See Table 6). The SIZE parameter 62 is dynamically calculated from the BEHAVIOR HISTORY 40 records over the last "n" uses of the device. The value of "n" is limited by the total uses of the device for that EVENT parameter 31 and USER parameter 39 and by a number such as 7, i.e. one week of uses.

Auto Setting 61d

The AUTO setting 61d of PLAN parameter 61 substantially provides for automatic generation of the planned SIZE parameter 62 in the same manner as described as for the AVERAGE setting 61c with the addition that the DELTA parameter 110 is added to the result. The DELTA parameter 110 is generated separately based on, but is not limited to: (1) the DAILY HISTORY 120 of a user's CUR parameter 94 that is to be modified, (2) a GOAL parameter 96 which is sought by the user, and (3) a RATE parameter 98 or speed at which the user desires to achieve the GOAL parameter 96. The DELTA parameter 110 is described in more detail later. Operation of the device is substantially otherwise identical to the AVERAGE setting 61c.

Alert Setting 61e

The ALERT setting 61e of PLAN parameter 61 uses longer time periods, minutes for example and not by limitation, instead of seconds, to provide an alerting signal, a fourth output, for modifying longer-term behaviors. The ALERT setting 61e is handy for reminding the user to initiate a desirable behavior, such as when to drink additional water throughout the day, or to restrict the time between undesirable behaviors, such as when to have a snack, when to consume a cigarette, or when to have an alcoholic beverage, etc. When the undesirable behavior is initiated, then the user can use a PLAN parameter 61 setting of PACED 61a, FIXED 61b, AVERAGE 61c, or AUTO 61d to restrict the rate at which the undesirable behavior is to be performed or to be repeated, and the total number of behavior actions as set by the SIZE parameter 62.

Ramp Parameter 64

The RAMP parameter 64 affects the current PACE parameter 142 during a single activation. Generally, the desire is to have the pace of behavior actions to slow during the behavior sequence. If the RAMP parameter is 0, no ramping is performed, and the current PACE parameter is the same as the PACE parameter 63. If the RAMP parameter is 1, the current PACE parameter 142 is modified from the PACE parameter 64 during the execution of the behavior sequence such that the pace of last half of the behavior sequence is approximately 15% slower than the first half of the sequence. Various profiles are possible, and other RAMP values can provide other ramping behaviors.

Objective Parameters 90

Within OBJECTIVE parameters 90 are CUR parameter 94, RATE parameter 98, and GOAL parameter 96. Each of these parameters must have units which are consistent, and should substantially relate to physical measurements which are indirectly a result of the behavior to be modified, and are used to calculate the DELTA parameter 110. For the dietary example, the objective parameters can be, but not limited to, the user's weight in pounds or kilograms, or they may be the waist measurement in centimeters, or the percentage of body fat, or any other similar measurement, or a combination of any of these. It is not necessary for the units to be absolute or even customary units, as long as they are consistent.

Cur Parameter 94

CUR parameter 94 refers to a particular user's current physical measurement, and has a range of about 0–999 units. The user should adjust the CUR parameter 94 at the start of each day so that it substantially matches his actual physical measurement. For the dietary example, and using weight as the physical measurement, the user should generally weigh his body using the same scale at the same time of day, preferably in the morning. If no changes are made to the value of the CUR parameter 94 and the device is activated for the first EVENT of the day (such as BREAKFAST), then device 10 assumes that the parameter as previously adjusted is correct.

The CUR parameter 94 is stored for "m" prior days in the DAILY HISTORY record 120. "m" is typically about 10 or 14.

Goal Parameter 96

GOAL parameter 96 refers to the user's desired future value of CUR parameter 94. In the dietary example, if the user wishes to lose weight, a value in pounds less than the CUR parameter 94 value is required. The range of the GOAL parameter is 0–999 units.

Rate Parameter 98

RATE parameter 98 refers to the rate of change of the CUR parameter 94 toward the GOAL parameter 96. The RATE parameter is in units per week, and is a value with tenth-units. The default value is about 0.5 units per week.

By way of example and not limitation, if the user wishes to lose weight and is currently 200 pounds, and wishes to lose 25 pounds, the CUR parameter 100 should be set to 200 pounds, the GOAL parameter 96 should be set to 175 pounds, and the RATE parameter should be set to 0.5 pounds per week.

Internal Parameters 51

Some of the parameters in the Parameter Set 50 are called Internal Parameters 51 since they are not generally adjustable by the user using input means 26 and Display Means 27.

These parameters may be read or written using the accessory interface 23, however. The Internal Parameters 51 include but not limited to the Behavior Records 40, Daily History Records 120, and Delta Parameter 110. There may be other internal parameters that are not explicitly described here to allow the control means 25 to control device 10 to operate as described in this detailed description.

Behavior Records 40

Referring now to FIG. 6, BEHAVIOR RECORDS 40 record the CNT parameter 143, for each specific meal and for each specific user. These records generally are used as a basis for deriving the current SIZE parameter 62 and PACE parameter 63 for that user for that meal. Depending on the setting of the PLAN parameter 61, specific behavior records may be retrieved and updated for a specific EVENT parameter 31 and specific USER parameter 39.

Daily History Records 120

The DAILY HISTORY 120 records and stores a specific user's CUR parameter 94, as that specific user enters this data into device 10. The DAILY HISTORY 120, per specific user, can be recorded and retained for up to about two weeks. A specific user's DAILY HISTORY 120 is associated with that user's GOAL parameter 96 and RATE parameter 98 in the calculation of DELTA 110.

Delta Parameter 110

DELTA parameter 110 is used only in the AUTO setting 61*d* of the PLAN parameter 61. DELTA parameter 110 is calculated generally using the DAILY HISTORY 120, GOAL parameter 96, and RATE parameter 98 for the current USER parameter 39 setting. It is then added to the SIZE parameter 62 calculated as in the AVERAGE setting 61*c* of the PLAN parameter 61. Before DELTA 110 is calculated, the DAILY HISTORY 120 must be initialized with CUR parameter 94 values sufficient to fill the DAILY HISTORY record, typically about 10 days.

With DAILY HISTORY 120 captured as described above, DELTA 110 can be calculated, without limitation, as follows:

a) TEMP1, a temporary data value, is determined by averaging values in DAILY HISTORY 120 over the most recent "f" days. "f" may be 4 days, for example.

b) TEMP2, a temporary data value, is determined by averaging values in DAILY HISTORY 120 over "f" days prior to one-week prior to the current day.

c) TEMP3=ABS (TEMP1−TEMP2).

d) GOALDIR=SIGN (GOAL−CUR). −1 means that the user wishes to decrease CUR parameter 100 (i.e. lose weight for example) and +1 means that the user wishes to increase CUR parameter 100.

e) CURDIR=SIGN (TEMP1−TEMP2). For example, −1 means that the user has lost weight over the interval, and +1 indicates that the user has gained weight over the interval. 0 means that there was no detected change in weight.

f) DELTA is then calculated according to the following table:

TABLE 7

| DELTA CALCULATION | | | |
|---|---|---|---|
| GOALDIR | CURDIR | | DELTA |
| +1 | +1 | TEMP3 >= RATE | 0 |
| −1 | −1 | TEMP3 >= RATE | 0 |
| 0 | ANY | | 0 |

TABLE 7-continued

| DELTA CALCULATION | | | |
|---|---|---|---|
| GOALDIR | CURDIR | | DELTA |
| +1 | +1 | TEMP3 < RATE | +1 |
| −1 | −1 | TEMP3 < RATE | −1 |
| +1 | −1 | | 2 |
| −1 | +1 | | −2 |

For example, if the user starts at 200 pounds, and wants to reduce to 175 pounds, the user would set his GOAL parameter 96 to 175 pounds and his CUR parameter 94 to 200 pounds, and accept the default RATE parameter 98, which is 0.5 pounds per week. On subsequent days, the user will enter the new CUR parameter 94 each morning by weighing and adjusting the CUR parameter 94 from the previous day. If the user's weight has not changed, he need not adjust the CUR parameter 94 since the prior day's CUR parameter 94 will be used for each subsequent day until a change is entered.

Consider the following example where the user uses the device as described and enters the following values on each of several subsequent days:

| Day | Weight | |
|---|---|---|
| Day 0 (Today) | 196 | \ |
| Day −1 (Yesterday) | 196 | \ Filter Window "f" for TEMP1 |
| Day −2 | 197 | / |
| Day −3 | 197 | / |
| Day −4 | 198 | |
| Day −5 | 202 | |
| Day −6 | 199 | |
| Day −7 | 200 | \ |
| Day −8 | 201 | \ Filter Window "f" for TEMP2 |
| Day −9 | 200 | / |
| Day −10 | 199 | / |

DELTA is calculated according to the Derive DELTA 112 algorithm, as follows:

a) TEMP1 will be the average of 196, 196, 197, and 197 resulting in 196.5.

b) TEMP2 will be the average of 200, 201, 200, and 199 resulting in 200.

c) TEMP3 is ABS (196.5−200) resulting in 3.5.

d) GOALDIR=SIGN (175−200)=−1.

e) CURDIR=SIGN (196.5−200)=−1.

f) TEMP3>=RATE and GOALDIR=CURDIR, so DELTA=0.

State Parameters

FIG. 7 illustrates the STATE parameters 140 of device 10, including DEVICE STATE parameter 141, TIMER parameter 144, and CNT parameter 143.

Device State Parameter 141

DEVICE STATE parameter 141 generally has a discrete number of settings. These include: DEACTIVATED setting 141*a*, ACTIVATED setting 141*b*, PAUSED setting 141*c*, and LOGGING setting 141*d*. These settings generally are associated and coupled to the GO/PAUSE key 16*a* and the STOP key 16*b* of device 10 as shown in Table 2. The default setting is DEACTIVATED setting 141*a*.

CNT Parameter 143

CNT Parameter 143 maintains the current count of signals produced during ACTIVATED setting 141*b* of the DEVICE STATE parameter 141. This parameter starts at 0 and increments generally for each signal generated by the Output Means 29, with no dependence on the type of signals produced. If the DEVICE STATE parameter 141 is transitioned from the ACTIVATED setting 141b to the PAUSED setting 141c, the accumulation of CNT 143 is suspended until the ACTIVATED setting 141b is re-established.

Timer Parameter 144

The TIMER parameter 144 provides a means of timing signals 29. The TIMER parameter 144 starts at 0 and increments for each second that elapses, until it reaches the PACE parameter 63 value. Then output means 29 produces a signal according to Table 6, and TIMER 144 is reset to 0. This process continues throughout the period wherein the DEVICE STATE parameter 141 is set to the ACTIVE setting 141b.

OPERATION

The discussion which follows and the Figures in support thereof relate to a dietary configuration for the present invention. Though shown for dietary purposes, it must be understood that the invention can be configured for many types of behaviors for the purpose of monitoring or modifying that particular behavior.

The sections that follow detail the following operations: Transition from Standby, Manual Adjustment of Parameters, PACED, FIXED, AVERAGE, AUTO, and ALERT Plan Use of the device, and the transfer of parameters to and from an associated device.

Transition from Standby

As seen in FIG. 9, the unit is awakened from a standby mode by pressing any key. Although this is the preferred embodiment, the power-on operation can be achieved through other similar means, such as a simple power switch. After initially bringing the device to an operational state, the displays of the device will be utilized as follows. The Default values are used if this is the initial power-on from the factory.

TABLE 8

| | DEFAULT DISPLAY | |
|---|---|---|
| Display Part | What is displayed | Default |
| Display 11 | EVENT parameter 31 setting | (blank) |
| Display 12 | PACE parameter 63 setting | 45 |
| Display 13 | SIZE parameter 62 setting | (blank) |
| Display 14 | PLAN parameter 61 setting | "Paced" |
| Display 15 | Battery low/OK | (OK) |

Manual Adjustment of Parameters
Parameter Adjustment Overview

To adjust parameter values, a user presses any one of the parameter select keys 9 or 220 on device 10 such as the objective keys 20, the group keys 21, or the CONTROL keys 22, when in DEACTIVATED 141a, LOGGING 141d, or PAUSED 141c settings of the DEVICE STATE parameter 141. After pressing one of the parameter select keys 9 or pressing the single parameter select key 220, the name of the parameter and its current value will be displayed according to Table 5. The use adjusts the settings which display thereon using the scroll keys 18. To accept the setting the GO/PAUSE key 16a is pressed. Pressing the STOP key 16b will abort the setting process. Pressing a parameter select key 9 or 220 will accept the new setting and move to another parameter. This procedure is repeated with all the desired parameters.

Parameter Adjustment Examples
Manual Adjustment of User Parameter

As seen in FIG. 10, the USER parameter is manually adjusted as follows. By pressing USER key 21b, the USER parameter 39 selected for modification Display 12 will show word "USER", and display 13 will show the current value of the USER parameter 39. Pressing scroll keys 18 will increment or decrement the user identifier of the device. When the user is satisfied with the setting of the USER parameter, the GO/PAUSE key is pressed to select that setting. If the STOP key is pressed instead, there is no change to the parameter, and the original setting is used instead.

Manual Adjustment of other Parameters

Other parameters are adjusted in the same manner as the examples shown above.

Preferred Order of Selection and Variations

To ease the user of the device, defaults for most of the parameters exist in the preferred embodiment for use by the user who does not wish to set up the various parameters manually. For the new user of the device, the PACED setting 61a of the PLAN parameter 61 may be used immediately with no other changes in other parameters.

The Table 9 shows the parameters which are applicable to each PLAN parameter 61 setting.

TABLE 9

| APPLICABLE PARAMETERS | | | | | |
|---|---|---|---|---|---|
| | PLAN PARAMETER 61 SETTING | | | | |
| PARAMETER | PACED 61a | FIXED 61b | AVG 61c | AUTO 61d | ALERT 61e |
| USER 39 | X | X | X | X | X |
| SIZE 62 | | X | X | | X |
| PACE 63 | X | X | X | X | X |
| RAMP 64 | | X | X | X | |
| EVENT 31 | | X | X | X | X |
| CUR 94 | | | | X | |
| GOAL 96 | | | | X | |
| RATE 98 | | | | X | |

Transfer of Parameters to/from Associated Device

As shown in FIG. 8, Device 10 may be connected to a companion device 300 using accessory interface 23 and-communication channel 310. Commands are issued to device 10 using the communication channel 310 by the companion device 300 to transfer any or all parameters in the parameter set 50 to the companion device 300, and it is possible for the companion device 300 to issue commands to write all or part of the parameter set 50 within device 10. It is also possible to update the control program 70 by the companion device to establish an entirely new operational modes.

Normal use of this facility allows "smart" companion devices, such as a smart scale which will automatically adjust the CUR parameter 94 and the DAILY HISTORY 120.

Application software on a personal computer can analyze the data obtained from the device to produce reports and other feedback to the user, support groups, and clinicians.

Paced Setting 61a Operation

A typical defaulted use of device 10 as shown in FIG. 1 is illustrated in FIG. 21. This entails use of the device 10 in the PACED setting 61a of the PLAN parameter 61. The default display configuration is shown in TABLE 8. To activate the device 10 in this mode of operation, a user presses the GO/PAUSE key 16a. Display 11 will remain blank in this mode of use and the setting of the EVENT parameter 31 is not displayed. In this mode, second display 12 shows the seconds elapsing, as tracked by TIMER parameter 144, from the initiation of each signal as provided by output means 29 until the next signal. The device 10 begins with "0" in the second display and increments by single digits, per second, to about "45" seconds. Third display 13 shows the CNT parameter 143. The third display also begins with "0" and increments one digit or count, which represents the number of behavior actions, about every 45 seconds. Fourth display 14 will show "Paced" as the setting of the PLAN parameter 61. When the TIMER reaches about "45", in addition to incrementing the CNT parameter 143 and displaying the new count in third display 13, a first signal is generated. TIMER 144 resets to 0. In this PACED setting 61a mode, no second or third signals are generated. Only the first signal, time between behavior actions, is generated.

Pausing in Paced Plan

To pause the operation of the plan, the GO/PAUSE key 16a is depressed. When so paused, second display 12 displays the word "WAIT" indicating a paused state, third display 13 holds steady the last value of the CNT parameter 143, and fourth display 14 shows the word "PACED". Re-pressing the GO/PAUSE key 16a resumes the operation of the plan. To stop the operation of the plan, a user merely presses the STOP key 16b.

Event-Specific Plan Operation

A event-specific and user-specific first use of device 10 is illustrated in FIG. 22. The operational procedures used in this example apply to the FIXED setting 61b, AVERAGE setting 61c, and AUTO setting 61d of the PLAN parameter 61. The example uses the FIXED setting 61b of the PLAN parameter 61 and a specific user. In this case, selecting the USER parameter 39 and the EVENT (Meal) parameter 31 is done as described above. The default interval between behavior actions, the PACE parameter 63, is provided by the BEHAVIOR RECORDS 40 which records the user's last executed PACE parameter 63 for each meal. The user can modify the so derived PACE parameter 63 by pressing the PACE key 20a and then the scroll keys 18 to adjust the PACE parameter 63 (refer also to FIG. 14). The SIZE parameter 62 of the meal can also be adjusted by using the procedure illustrated in FIG. 15.

After verification of the values of the USER parameter 39, the EVENT parameter 31, the PLAN Parameter 61, the SIZE parameter 62, and the PACE parameter 63, the user may press the GO/PAUSE key 16a to activate and execute the plan. Second display 12 shows the seconds elapsing, from the TIMER 144, the time interval elapsed from the prior behavior action. It begins with "0" and increments until it reaches the Current Pace Parameter 142, in this case, to about "45" seconds. Third display 13 shows the CNT parameter 143. In this case, the display is initially "0". Fourth display 14 reveals, the respective setting of the PLAN parameter 61, which in this case, displays "Fixed", corresponding to the FIXED setting 61b. When TIMER parameter 144 reaches about "45", output means 29 generates a first output signal and the CNT parameter 143 in third display 13 increments to "1". TIMER parameter 144 resets to 0. This process repeats each time TIMER parameter 144 reaches about "45". The output signal generated in this mode of operation will vary depending on the relation of the value of the CNT parameter 135 to the SIZE parameter 62, according to TABLE 6.

Pausing in Event-Specific Plans

To pause the operation of the device, the user may press the GO/PAUSE key 16a. When paused, the second display 12 displays the word "WAIT", indicating a paused state, the third display 13 displays and holds steady the value of the last CNT parameter 143, and the fourth display 14 shows the word "FIXED" in non-blinking fashion. To resume the operation of the device, the GO/PAUSE key 16a is pressed.
0
Stopping and Logging To stop the operation of the device, the user should press the STOP key 16b. When stopped, the second display will show "LOG?" to allow the user to confirm that he was able to maintain adequate correspondence between the output signals and the behavior actions comprising a behavior sequence. If the user presses the STOP key 16b a second sequential time within approximately 10 seconds, the CNT parameter 143 will be logged in the BEHAVIOR RECORDS 40 for that user and that meal. To disregard the accumulated CNT parameter 143 value for that behavior sequence, nothing need be done within that approximate 10-second period.

Auto Setting 61d Operation

When the user desires to continue on a regular routine to modify his behavior, he will generally select the AUTO setting 61d as his PLAN parameter 61 and will enter his current physical state or condition into CUR parameter 94, enter his GOAL parameter 96, and enter his desired RATE parameter 98. Making these entries establishes a BEHAVIOR RECORD 40 and a DAILY HISTORY 120 identified to that user.

A user's CUR parameter 94 is recorded and stored in a user's DAILY HISTORY record 120. A user's GOAL parameter 96 and RATE parameter 98 are recorded one time for each user. Based on the GOAL parameter 96 and RATE parameter 98, with additional information retrieved from the user's BEHAVIOR RECORD 40 and the user's DAILY HISTORY 120, DELTA parameter 110 is derived which affect the value of SIZE parameter 62 for each activation.

Alert Setting 61e Operation

A typical use with the PLAN parameter 61 set to the ALERT setting 61e permits the user to set the PACE parameter 63 as in other plans, but the time-units are displayed and generally operated in minutes or longer, rather than in seconds. This allows the user to establish repeating alerts throughout the day which typically are used to indicate the first time at which a user may perform an undesirable behavior, such as smoking a cigarette or having an alcoholic drink, or a limit by which a given desired behavior is to be already performed, such as having a drink of water. A user can be alerted by the device with the PLAN parameter 61 set to the ALERT setting 61e to initiate another PLAN parameter 61 setting by then using the EVENT parameter 31 set to the GENERIC setting 31g to allow and measure performance of any undesirable behavior at a constrained rate.

For example, if the user wishes to limit alcoholic intake, while still allowing social-drinking, he may set the ALERT setting 61e and set the PACE parameter 63 to space his drink by, for example, 30 minutes. Then, when alerted, he may switch to the FIXED setting 61b of the PLAN parameter 61 and select the GENERIC event setting 31g that he can pace the rate at which he is consuming the drink. The selection of, for example, a 90-second spacing between sips of the drink will allow the user to 'nurse' the drink and perhaps not become intoxicated.

While specific embodiments of the claimed invention have been shown and fully explained above for the purpose of illustration, it should be understood that many other uses will be found for the instant invention disclosure and many alterations, modifications, and substitutions may be made thereto without departing from the spirit and scope of the invention as defined by the appended claims. Such are intended to be included within the scope of the invention.

Accordingly, the scope of the invention should be determined not by the embodiments illustrated, but by the appended claims and their legal equivalents.

I claim:

1. A device adapted to modify specific behavior of a user of said device, said specific behavior comprised of a plurality of behavior sequences further comprised of a sequence of discrete behavior actions and behavior intervals between said discrete behavior actions, said device comprising:
   a) a control means adapted to produce operational states of said device;
   b) a parameter set provided by said control means, said parameter set including one or more parameters and adapted to determine the operation of said control means;
   c) an adjustment means adapted to adjust one or more said parameters in said parameter set to one or more values;
   d) a display means adapted to display said values of one or more said parameters in said parameters set to a user;
   e) an output means adapted to produce one or more signals for a single said discrete behavior action;
   f) an activation parameter contained within said parameter set, said activation parameter having at least two states corresponding to
      i) active state, wherein said signals are generated to prompt the user in said behavior sequence;
      ii) inactive state, wherein said device is not in said active state;
   g) a pace parameter contained within said parameter set, said pace parameter relating to a time duration between said signals during said active state, said time duration corresponding to said behavior intervals; and
   h) a timing means provided by said control means, said timing means adapted to generate said time duration between said signals according to said pace parameter; whereby when a user activates said device using said adjustment means to select said active state, said timing means determines said time duration between said signals according to said pace parameter, and said output means generates said signals such that, by following said signals the user engages in a said behavior sequence adapted to modify said specific behavior.

2. The device as defined in claim 1 further having means to suspend and resume said active state.

3. The device as defined in claim 1 further having a counting means provided by said control means, said counting means adapted to accumulate an actual count of said signals, said actual count a parameter contained within said parameter set.

4. The device as defined in claim 3 further including a planned size parameter contained within said parameter set.

5. The device as defined in claim 4 wherein a relation between said planned size parameter and said actual count determines the type of said signals during said active state.

6. The device as defined in claim 1 further having a plurality of active states.

7. The device as defined in claim 6 further having a first means to record said pace parameter and said planned size parameter and said actual count as used in one or more of said plurality of active states to form a plurality of behavior records, said behavior records contained within said parameter set.

8. The device as defined in claim 7 further having a first group parameter adapted to select said behavior records for each of one or more groups, each said group comprised of one or more said behavior records each for a single said behavior sequence, said first group parameter contained within said parameter set.

9. The device as defined in claim 1 further having one or more derivation means adapted such that one or more said parameters in said parameter set are derived using one or more of said parameters in said parameter set.

10. The device as defined in claim 9 further having a plan parameter, within said parameter set, adapted to achieve a unique value corresponding with each said derivation means.

11. The device as defined in claim 4 further having one or more derivation means adapted such that one or more said parameters in said parameter set are derived using one or more of said parameters in said parameter set; said device further having a plurality of active states; said device further having a first means to record said pace parameter and said planned size parameter and said actual count as used in one or more of said plurality of active states to form a plurality of behavior records, said behavior records contained within said parameter set; wherein said derivation means uses said behavior record.

12. The device as defined in claim 1 further having a current parameter relating to a physical measurement, said current parameter contained within said parameter set.

13. The device as defined in claim 12 further having a recording means to record a plurality of current parameters in a history record, said history record contained within said parameter set.

14. The device as defined in claim 12 further having a goal parameter adapted to describe a desired future value of said current parameter, said goal parameter contained in said parameter set.

15. The device as defined in claim 12 further having a rate parameter adapted to describe a desired rate of change of said current parameter, said rate parameter contained in said parameter set.

16. The device as defined in claim 13 further having a group parameter means adapted to select distinct said history records, said group parameter means contained within said parameter set.

17. The device as defined in claim 1 further having a ramp parameter adapted to select a rate of change of said time duration during a single said active state, said ramp parameter contained within said parameter set.

18. The device as defined in claim 1 further having a means to transfer all or part of said parameter set to or from a second device.

* * * * *